USO10953951B2

(12) United States Patent
Schlanger

(10) Patent No.: US 10,953,951 B2
(45) Date of Patent: Mar. 23, 2021

(54) CANTILEVER AXLE ASSEMBLY

(71) Applicant: Raphael Schlanger, Wilton, CT (US)

(72) Inventor: Raphael Schlanger, Wilton, CT (US)

(*) Notice: Subject to any disclaimer, the term of this patent is extended or adjusted under 35 U.S.C. 154(b) by 410 days.

(21) Appl. No.: 15/997,354

(22) Filed: Jun. 4, 2018

(65) Prior Publication Data
US 2018/0334218 A1 Nov. 22, 2018

Related U.S. Application Data

(63) Continuation-in-part of application No. 15/681,410, filed on Aug. 20, 2017, now Pat. No. 10,676,149, which is a continuation-in-part of application No. 14/974,228, filed on Dec. 18, 2015, now abandoned, and a continuation-in-part of application No. 14/974,451, filed on Dec. 18, 2015, now Pat. No. 9,758,209, which is a continuation-in-part of application No. 14/958,263, filed on Dec. 3, 2015, now Pat. No. 10,112,439, which is a continuation-in-part of application No. 14/952,645, filed on Nov. 25, 2015, now Pat. No. 9,815,329, which is a continuation-in-part of application No. 14/602,543, filed on Jan. 22, 2015, now Pat. No. 9,561,833.

(60) Provisional application No. 62/603,694, filed on Jun. 9, 2017, provisional application No. 62/381,155, filed on Aug. 30, 2016, provisional application No. 62/124,391, filed on Dec. 18, 2014.

(51) Int. Cl.
B62K 25/00 (2006.01)
B62K 25/02 (2006.01)
B60B 35/00 (2006.01)
B60B 27/02 (2006.01)

(52) U.S. Cl.
CPC .......... *B62K 25/005* (2013.01); *B60B 27/023* (2013.01); *B60B 27/026* (2013.01); *B60B 35/004* (2013.01); *B62K 25/02* (2013.01); *B62K 2206/00* (2013.01)

(58) Field of Classification Search
CPC .. B62K 25/005; B62K 25/02; B62K 2206/00; B60B 27/023; B60B 27/026; B60B 35/004
USPC .................................................... 301/111.06
See application file for complete search history.

(56) References Cited

U.S. PATENT DOCUMENTS 4,170,369 A * 10/1979 Strutman ............... B62K 21/02
188/26
4,878,558 A * 11/1989 Asakura ............... B62K 25/005
180/219

(Continued)

*Primary Examiner* — Kip T Kotter

(57) ABSTRACT

A vehicle wheel axle assembly including: an axle extending along an axial axis having a first end and a second end axially opposed to the first end; a hub shell rotatable about the axle and about the axial axis; a frame element having a dropout for connection with the axle. The axle is a cantilevered axle with a first end removably connected to the dropout. The first end includes an axially outwardly facing first end face. The dropout includes an axially inward facing inboard face and an open slot to receive the axle adjacent the first end, with the open slot including an open entrance portion, a closed terminus region, slot sidewalls extending between the entrance portion and the terminus region. The axle is generally radially inwardly assembled to the open slot through the open entrance.

20 Claims, 15 Drawing Sheets

(56) References Cited

U.S. PATENT DOCUMENTS

| | | | | |
|---|---|---|---|---|
| 6,089,675 A | * | 7/2000 | Schlanger | B60B 27/023 |
| | | | | 280/279 |
| 2002/0140201 A1 | * | 10/2002 | Kirk | B62K 25/02 |
| | | | | 280/279 |
| 2011/0049833 A1 | * | 3/2011 | Kinzler | B62K 25/005 |
| | | | | 280/276 |
| 2018/0086139 A1 | * | 3/2018 | Xu | B62K 19/30 |

* cited by examiner

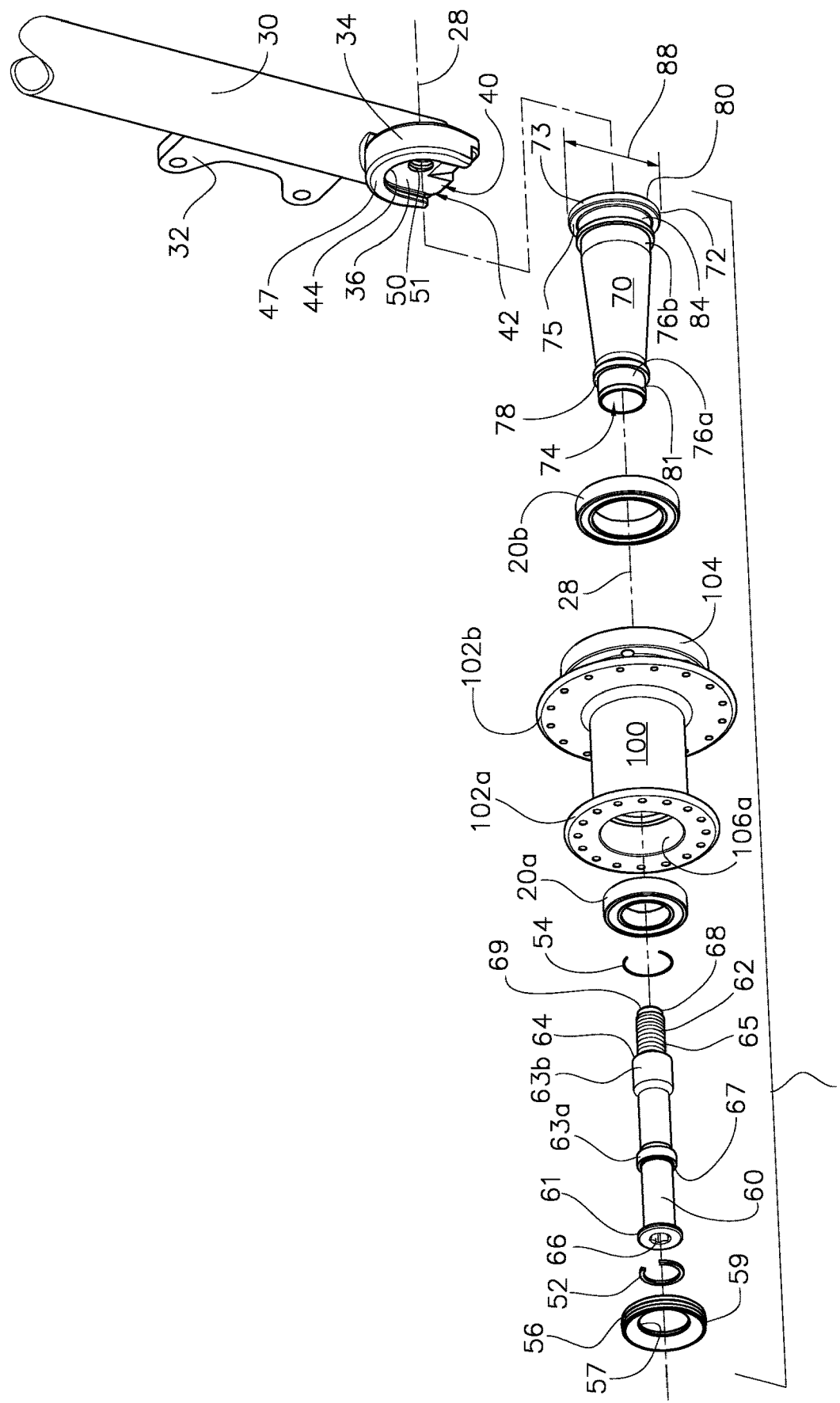

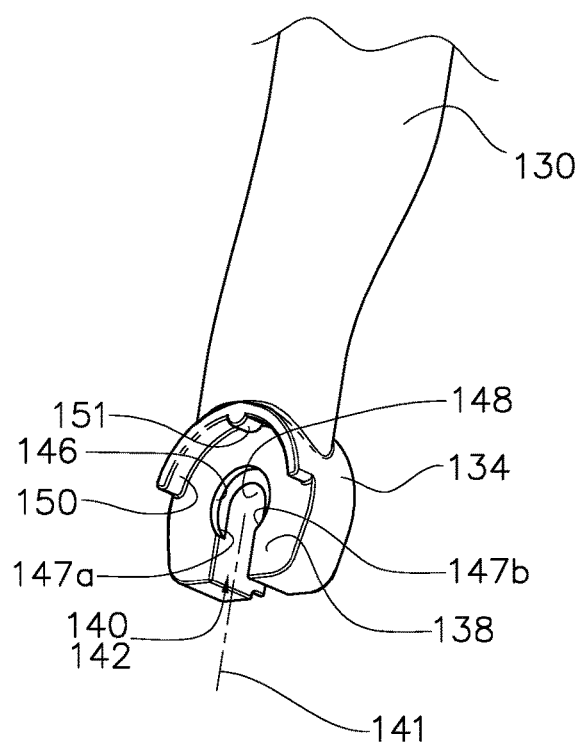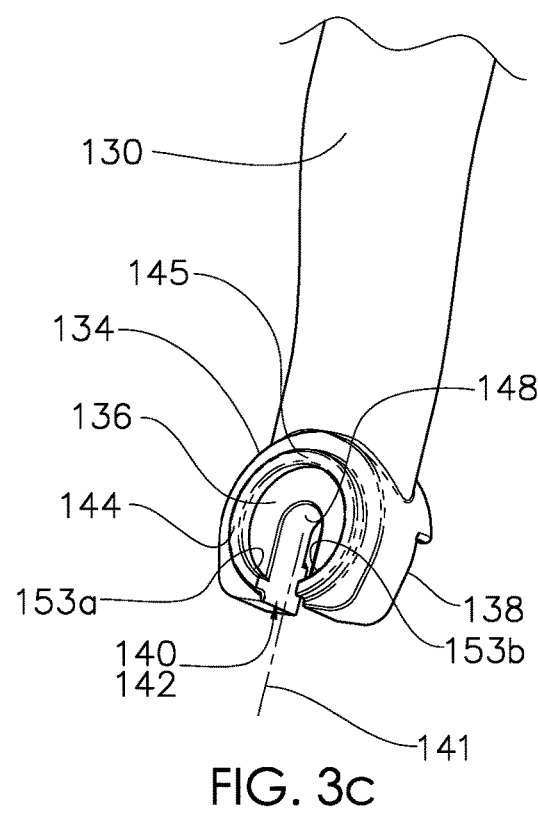

CANTILEVER AXLE ASSEMBLY

CROSS-REFERENCE TO RELATED APPLICATION

This application claims priority of U.S. Provisional Patent Application 62/603,694 filed Jun. 9, 2017.

This application is also a Continuation-In-Part of U.S. patent application Ser. No. 15/681,410, filed Aug. 20, 2017, which is currently pending.

U.S. patent application Ser. No. 15/681,410 claims priority of U.S. Provisional Patent Application 62/381,155, filed Aug. 30, 2016 and entitled "VEHICLE WHEEL AXLE ASSEMBLY".

U.S. patent application Ser. No. 15/681,410 is also a Continuation-In-Part of U.S. patent application Ser. No. 14/974,228, filed Dec. 18, 2015, which is currently pending.

U.S. patent application Ser. No. 15/681,410 is also a Continuation-In-Part of U.S. patent application Ser. No. 14/974,451, filed Dec. 18, 2015, which is currently pending.

U.S. patent application Ser. No. 14/974,451 claimed priority of U.S. Provisional Patent Application 62/124,391, filed Dec. 18, 2014.

U.S. patent application Ser. No. 14/974,451 is also a Continuation-In-Part of U.S. patent application Ser. No. 14/958,263 filed Dec. 3, 2015, which is currently pending.

U.S. patent application Ser. No. 14/958,263 is a Continuation-In-Part of U.S. patent application Ser. No. 14/952,645 filed Nov. 25, 2015, which was issued as U.S. Pat. No. 9,815,329 on Nov. 14, 2017.

U.S. patent application Ser. No. 14/952,645 is a Continuation-In-Part of U.S. patent application Ser. No. 14/602,543 filed Jan. 22, 2015, which was issued as U.S. Pat. No. 9,561,833 on Feb. 2, 2017.

BACKGROUND—FIELD OF THE INVENTION

The present invention relates to a cantilever vehicle wheel axle assembly, particularly including aspects that facilitate the connection between the axle and the frame to which the vehicle wheel is mounted. The present invention is particularly applicable to a bicycle wheel axle assembly that facilitates the connection between axle of a bicycle wheel and the frame of a bicycle.

BACKGROUND—DISCUSSION OF PRIOR ART

While cantilever axle arrangements are somewhat unusual in the bicycle industry, such arrangements are gaining in popularity. In the majority of prior-art cases the cantilever axle is integral and monolithic with the single fork blade. In the few instances where a cantilever axle is removable from the fork blade, the axle is simply assembled to an axially extending through-hole in the dropout, without any sort of self alignment and/or pre-engagement. In the vast majority of instances where a cantilever axle is utilized, a disc brake (including a disc rotor and caliper) is also utilized in combination.

In the case where the cantilever axle is integral and monolithic with the single fork blade, the caliper must be disassembled from the fork blade before the wheel assembly (including hub assembly) may be assembled or removed from the fork blade. This represents a very big inconvenience, since the wheel is commonly assembled or removed for shipment, or for repair, or when loading the bicycle in the trunk of a car for transport, among other reasons. Disassembly and re-installation of the caliper also requires a high degree of technical proficiency on the part of the user, which the lay person does not have.

In the case where the cantilever axle is removable from the fork blade, the axle is simply assembled to an axially extending through-hole in the dropout, without any sort of self alignment and/or pre-engagement. Without any pre-alignment, the wheel may easily tilt or become misaligned during assembly and disassembly of the wheel to the fork blade. If the wheel becomes misaligned, the rotor disc can correspondingly become misaligned within the caliper and the rotor disc may easily become bent and damaged in the process, an expensive and inconvenient prospect. Furthermore, if the wheel becomes misaligned, then the threadable assembly to secure the wheel becomes difficult to manipulate and may result in cross-threading and damage to the components.

In this case, assembling/disassembling the axle to/from the dropout is a frustrating and difficult procedure. The operator needs one hand to steady the bicycle and a second hand to steady the wheel (and its axle), and still needs a third hand to threadably secure the axle to the dropout.

SUMMARY OF THE INVENTION

The present invention is based on a cantilever axle, where the axle is detachable from the dropout of a frame (or fork), and where the dropout includes a slot to receive the axle. The slot allows the axle and the wheel to be easily assembled, installed, and connected to the dropout as well as being easily disassembled, uninstalled, and disconnected from the dropout. The dropout further includes axially opposed faces adjacent the slot and the axle includes axially opposed faces such that the faces of the axle are closely aligned with the mating faces of the dropout (or vice versa) to maintain axial pre-alignment of the axle relative to the dropout during this assembly and disassembly procedure. This axial pre-alignment maintains axial parallelism between the axle and dropout and also limits (or prevents) axial separation between the axle and dropout.

Further, the slot is a closed slot such that the axle may be installed within the slot to radially abut the closed end of the slot, providing radial pre-alignment between the axle and dropout. The axle is preferably secured to the dropout by a threadable means to threadably clamp the axle to the dropout for a firm connection therebetween.

OBJECTS AND ADVANTAGES

The axial pre-alignment provided by the present invention insures that the disc rotor (not shown) is properly centered and aligned with the brake caliper (not shown) during this assembly procedure. This is a significant advantage over prior art, since it all but eliminates the possibility that the rotor may be bent by the caliper and/or that the brake pads may be damaged by the rotor.

The radial pre-alignment provided by the present invention insures that the axle is radially aligned with the dropout and (in conjunction with the aforementioned axial alignment) further insures that the threadable means is properly aligned for threadable engagement in a subsequent assembly step. This further insures that the threadable engagement will not become cross-threaded or otherwise damaged. This provides a significant convenience for the operator and prevents costly and inconvenient damage.

Once the axle (and wheel connected thereto) has been pre-aligned to the dropout as described herein, the operator no longer needs to manually steady and align the axle, leaving a hand free to manipulate the threadable engagement to secure the axle to the dropout (and frame/fork connected thereto). This is a significant convenience to the operator, since the operator's other hand is likely occupied in steadying the bicycle. Thus the axle may be assembled to the dropout in a simple one-handed procedure.

The present invention provides a convenient, fast, and easy means to assemble and disassemble the axle to/from the dropout, while also protecting and insuring that there is no damage to the components during this procedure.

BRIEF DESCRIPTION OF THE DRAWINGS

The present invention will be more readily understandable from a consideration of the accompanying drawings, wherein:

FIG. 2*a* is an exploded perspective view of a first embodiment of the present invention, showing a single-sided fork with dropout and a hub assembly;

FIG. 2*b* is a perspective view of the embodiment of FIG. 2*a*, showing the hub assembly as assembled and axially aligned in preparation for assembly with the dropout, and with the control shaft in the retracted position;

FIG. 2*c* is an axial cross-sectional view, taken along 87-87 of the embodiment of FIG. 2*a*, corresponding to the assembly sequence described in FIG. 2*b*;

FIG. 2*d* is a perspective view of the embodiment of FIG. 2*c*, showing the hub assembly next assembled to the dropout, with the flange of the axle radially nested and axially captured within the open slot, and with the control shaft still in the retracted position;

FIG. 2*e* is an axial cross-sectional view, taken along 87-87 of the embodiment of FIG. 2*a*, corresponding to the assembly sequence described in FIG. 2*d*;

FIG. 2*f* is an axial cross-sectional view, taken along 87-87 of the embodiment of FIG. 2*e*, showing the pilot portion of the control shaft as axially overlapping and radially engaged to the hole of the dropout corresponding to a pre-engaged position of the control shaft;

FIG. 2*g* is a perspective view of the embodiment of FIG. 2*f*, showing the control shaft as next threadably engaged to the dropout to secure the hub assembly to the dropout, with the control shaft still in the extended position;

FIGS. 3*b*-*c* are perspective views detailing the fork blade and dropout of the embodiment of FIG. 3*a*;

FIG. 3*d* is an axial cross-sectional view taken along 98-98 of the embodiment of FIG. 3*a*, showing the hub assembly as assembled and axially aligned in preparation for assembly with the dropout, and with the screw threadably extended from the axle to provide clearance therebetween for subsequent assembly with the dropout;

FIG. 3*e* is an axial cross-sectional view taken along 98-98 of the embodiment of FIG. 3*d*, showing the hub assembly as next pre-assembled to the dropout in the generally radial direction, with the flange of the axle radially nested with the alignment surface and the key radially overlying one of the notches, and with the dropout axially straddled between the axle and screw;

FIG. 3*f* is an axial cross-sectional view taken along 98-98 of the embodiment of FIG. 3*e*, showing the screw as next threadably tightened with the axle to axially sandwich and clamp the dropout therebetween with the stub of the axle axially overlying the counterbore of the dropout and the head of the screw axially overlying the recess of the dropout;

FIG. 3*g* is a perspective view of the embodiment of FIG. 3*a*, corresponding to the assembly sequence described in FIG. 3*f*.

DETAILED DESCRIPTION OF THE INVENTION

Figure 1:
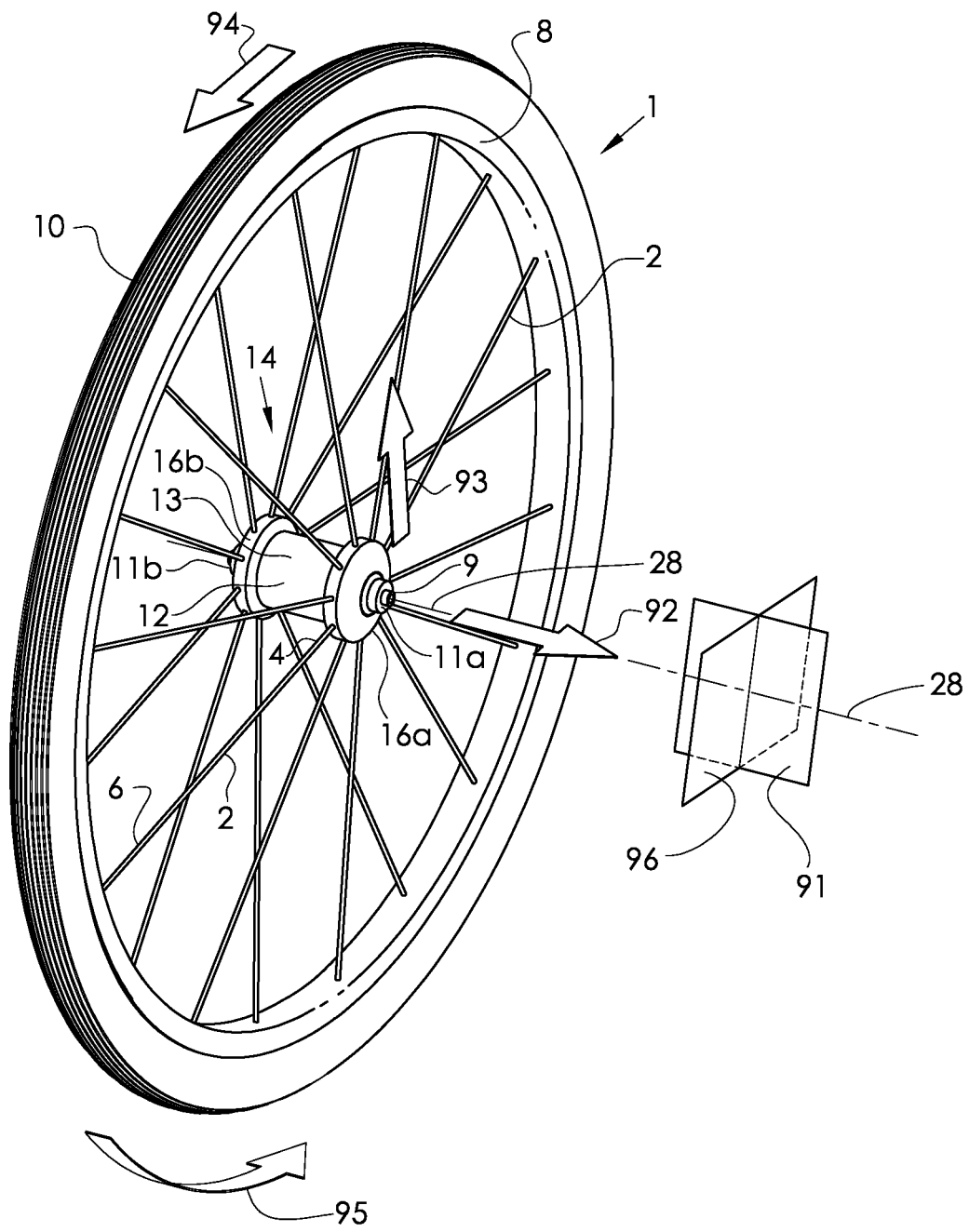
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the bicycle frame and the quick release skewer assembly are not shown in this figure. The hub shell 14 is rotatable about the axle 9 and includes at least two axially spaced hub flanges 16*a* and 16*b*, each of which include a means for connecting with a multiplicity of spokes 2 connected thereto. Axle 9 includes end faces 11*a* and 11*b* that define the spacing of its mounting with the frame (not shown). The axial axis 28 is the axial centerline of rotation of the bicycle wheel 1. The hub flanges 16*a* and 16*b* may be contiguous with the hub shell 14 or may be separately formed and assembled to the hub body 12 portion of the hub shell 14. Each spoke 2 is affixed to its respective hub flange 16*a* or 16*b* at its first end 4 and extend to attach the rim 8 at its second ends 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis.

In the ensuing descriptions, the term "axial" refers to a direction parallel to the centerline of the axial axis and the term "radial" refers to a direction perpendicular to the axial axis. An axially inboard (or inward) orientation is an orientation that is axially proximal to the axial midpoint between the two end faces 11*a* and 11*b*. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

While it is most common for the hub shell 12 to rotate about a fixed axle 9, there are some cases where it is desirable to permit the axle 9 to be fixed with the wheel 1 such as the case where the wheel 1 is driven by the axle 9.

It is noted that the axle 9 includes a first end axially adjacent the end face 11a and hub flange 16a and a second end axially adjacent the end face 11b and hub flange 16b. A cantilever axle is defined herein as an axle that is connected or mounted to a frame only at a first end and is radially unsupported at the axially opposite second end. The hub shell is rotatable about this axle between the first and second ends of the cantilevered axle. Such a cantilevered axle will be described further in the ensuing description of the preferred embodiments of the present invention.

Figure 2B:
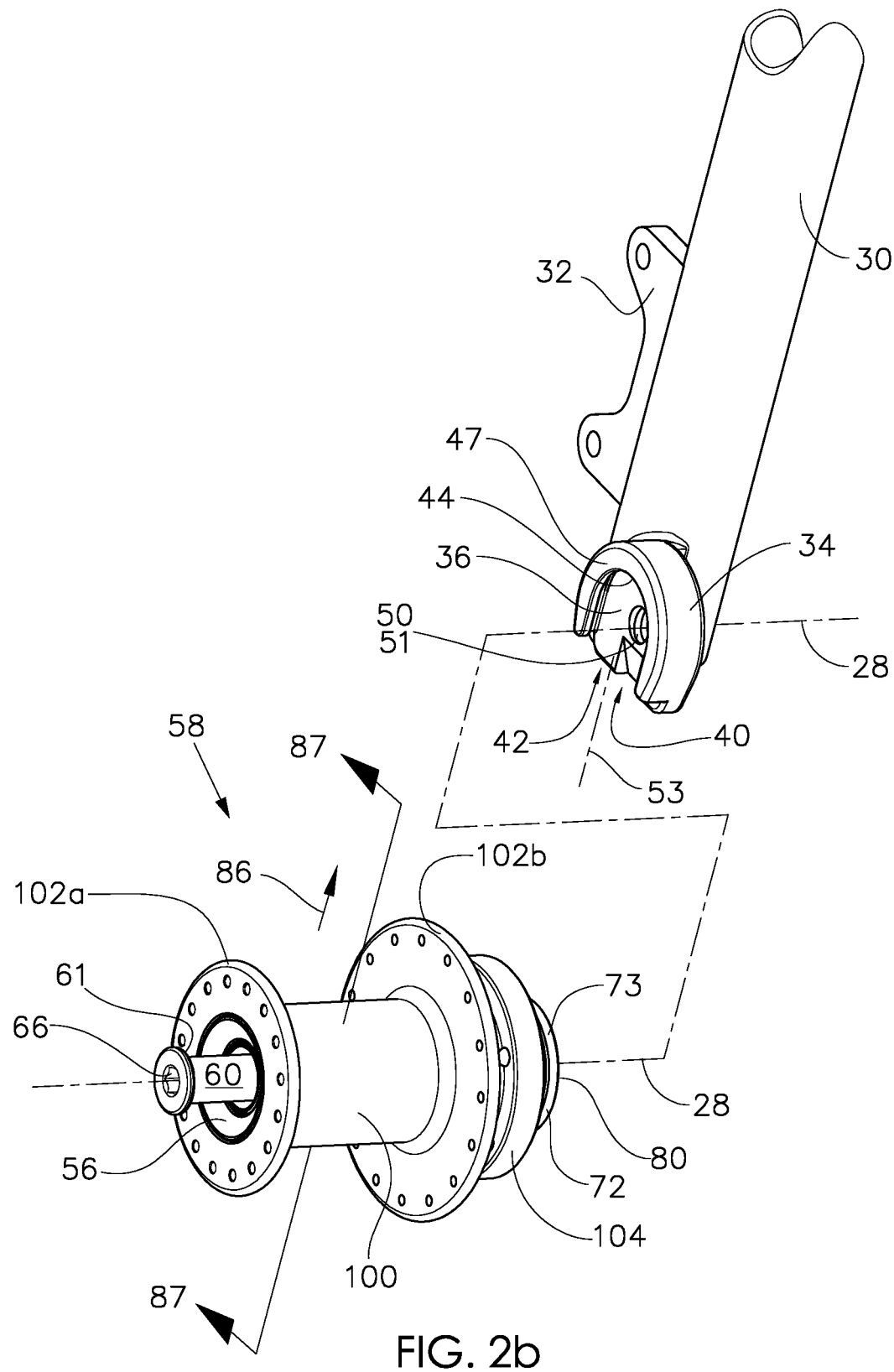
FIGS. 2*b*-*g* show the progressive sequential assembly steps involved in assembling the hub assembly to the dropout.

FIGS. 2a-i describe an embodiment of the present invention with a threaded engagement between a control shaft 60 of a hub assembly 58 and the dropout 34 of the frame (shown here as fork blade 30). In this embodiment, the dropout 34 includes an open-slot 40, for quick and easy assembly and removal of the hub assembly 58. FIG. 2a is an exploded view, showing the individual components of this embodiment.

Referring to FIGS. 2a-i, the dropout 34 may be considered mounting portion of the bicycle frame (not shown) or fork blade 30 to which the hub assembly 58 is mounted or connected. Dropout 34 includes open slot 40 of unique configuration in that it is radially stepped to provide axial engagement of the axle 70 upon pre-assembly thereto.

Fork blade 30 includes disc tab 32 to receive a disc brake caliper (not shown) in the conventional manner and dropout 34. Dropout 34 includes an outboard face 36 and an open slot 40 that is radially stepped to include a relieved region 39 and a flanged region 46. The relieved region 39 may be considered as a radially outwardly projecting groove that has an axial width 43 between its outboard face 36 and an inboard face 38 and a radial depth defined by closed end 48. Outboard face 36 and an inboard face 38 are axially opposed and facing each other. The flanged region 46 has an axial width 49 between its inner face 47 and inboard face 38. The flange 46 of open slot 40 has a generally inverted "U" shaped profile with an entrance 42 and with a terminus or closed end 44 and sidewalls 41a and 41b extending therebetween. The radial width 37 (shown in FIG. 2i) between sidewalls 41a and 41b is narrower than the diameter 88 of flange 72 and wider than the diameter 89 of necked region 80. Slot axis 53 extends generally radially between the entrance 42 and closed end 44 and defines the axis along which the axle 70 may be assembled thereto. The relieved region 39 of open slot 40 also has a generally inverted "U" shaped profile with an entrance 42 (in common with the flange 46) and with a closed end 48 and sidewalls (not labelled) having a radial width 35 (shown in FIG. 2i) therebetween. The "U" shaped profile of the relieved region 39 is sized to receive the flange 72 and is radially outwardly offset from the "U" shaped profile of the flange 46 which is sized to receive the necked surface 84. Radial width 37 is narrower than radial width 35 and is sized to radially receive the diameter 89 of necked surface 84. Radial width 35 is wider than radial width 37 and is sized to radially receive the diameter 88 of perimeter surface 73.

The "U" shaped profile of the flange 46 is sized to be smaller than the flange 72 such that the flange 72 could not fit therein. Outboard face 36 includes a hole 50 extending axially outwardly therefrom with internal threads 51 and a ramped guide surface 45. It is noted that the portion of the dropout 34 that is axially outward of outboard face 36 may be considered as a closed and non-slotted portion of the dropout 34 since this closed portion fully circumferentially surrounds and circumscribes the axial hole 50. This closed portion is shown to be axially offset and adjacent to the open slot 40. It is also seen that hole 50 is radially aligned and radially overlapping the open slot 40.

Hub assembly 58 includes the hub shell 100 that rotates around axle 70 via bearing assemblies 20a and 20b. Also included are control shaft 60, snaprings 52 and 54, and shield 56. Bearing assemblies 20a and 20b are shown here to be cartridge bearing assemblies that are well known in industry and comprise an inner race, an outer race, and a series of rolling elements therebetween. Such cartridge bearing assemblies are commonly used in similar applications and may be preferable, however it is understood that a wide range of alternative bearing types may be utilized, including plane bearings and/or bearings that may roll or slide directly on the axle 70 and/or hub shell 100 itself.

The axle 70 extends axially along an axial axis 28 to include two axially spaced bearing seats 76a and 76b, each with corresponding shoulders 78a and 78b respectively. Bearing seat 76a includes an external snapring groove 81 adjacent thereto to receive snapring 54. Axle 70 also includes a flange 72 with an end face 80, a perimeter surface 73, a necked surface 84, and an axially inwardly facing flange face 75 that is axially opposed and facing away from the end face 80. The diameter 88 of perimeter surface 73 is larger than the diameter 89 of the necked surface 84 with a radial offset therebetween. It is preferable that the perimeter surface 73 and the necked surface 84 are generally concentric about axial axis 28. Flange 72 has an axial width 90. Axle 70 also includes an opening 74 extending axially therethrough with an enlarged region 77, a stepped region 82, and a shoulder 83 therebetween. Enlarged region 77 also includes an internal groove 79 to receive snapring 52.

Concentric and coaxial within the axle 70 is the control shaft 60, which is both (axially) slideable and rotatable within the opening 74 about the axial axis 28. Control shaft 60 includes flange 61 for manual gripping, hex socket 66 for engagement with a hex key (not shown), guide surfaces 63a and 63b, axially outwardly facing shoulder 64 with externally threaded shaft 65 extending axially outwardly therefrom, and shoulder 67 axially opposed and facing away from shoulder 64. Flange 61 is considered the "control; end" for manipulation of the control shaft 60, while shaft 65 is considered the "engagement end" of the control shaft 60, since it has external threads 62 to threadably engage the dropout 34. Shaft 65 has external threads 62 and a pilot tip 68 with an end face 69. Shield 56 includes opening 57 and perimeter surface 59. Hub shell 100 includes hub flanges 102a and 102b to receive spokes (not shown) in the conventional manner, bearing bores 106a and 106b to receive bearings 20a and 20b respectively, and rotor flange 104 to receive a disc brake rotor (not shown) in the conventional manner.

The diameter of pilot tip 68 is sized to have clearance with the inside diameter of internal threads 51 such that, when the control shaft 60 is axially shuttled in direction 71 to achieve the pre-engaged position (as described in FIG. 2f), the pilot tip 68 will axially overlap the internal threads 51 such that the shaft 65 will be axially overlapping and radially retained to the dropout 34.

Figure 2C:
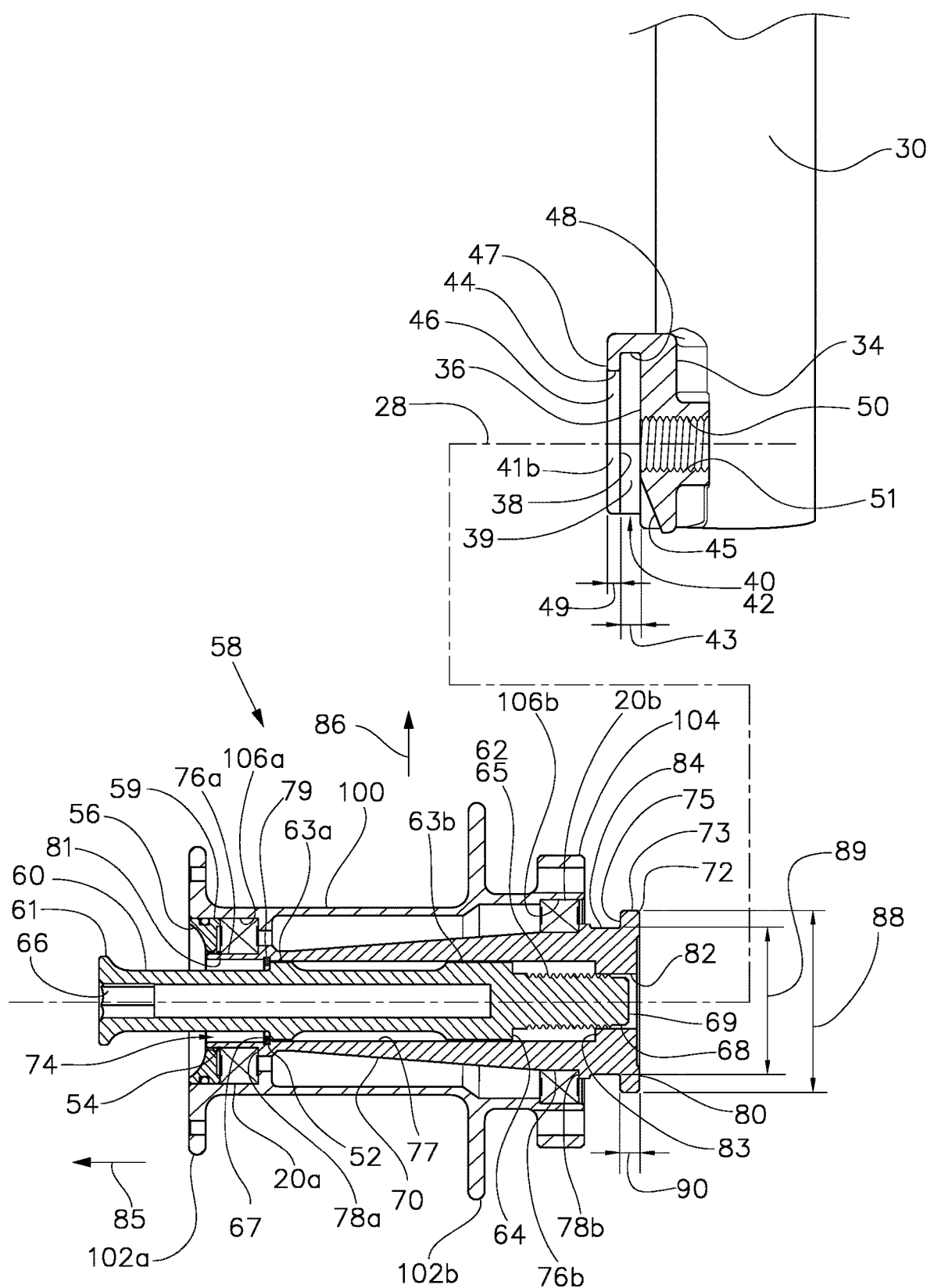

FIGS. 2b and 2c show the hub assembly 58 as assembled, with the control shaft 60 in the retracted position. Bearing 20a is assembled between bearing seat 76a and bore 106a and bearing 20b is assembled between bearing seat 76b and bore 106b in the conventional manner. Control shaft 60 is assembled coaxially within opening 74 with shaft 65 extending through stepped region 82. Snapring 52 is assembled to groove 79 to axially retain the control shaft 60 to the axle 70. Snapring 54 is assembled to groove 81 to axially retain the inner race of the bearing 20a to the axle 70. Shield 56 is assembled to hub shell 100 such that perimeter surface is press fit within bore 106a and such that flange 61 extends axially outwardly therethrough.

The control shaft 60 is shown to be retracted in direction 85 (i.e. the retracting direction) relative to the axle 70 until shoulder 67 axially abuts the snapring 52 to prevent the control shaft 60 from retracting further in direction 85. Snapring 52 provides an axial displacement limit stop relative to the axle assembly 24 to limit its axial travel. In this fully retracted position of the control shaft 60, the end face 69 is shown to be axially flush or axially inboard of the end face 80 to provide clearance for the subsequent assembly of the hub assembly 58 with the dropout 34. Snapring 52 also serves to insure that the control shaft 60 is positively retained with the axle 70, serving as a convenience to prevent the control shaft 60 from becoming separated from the hub assembly 58. The flange 72 is shown to be axially aligned with the relieved region 39, with the axle 70 radially offset from the dropout 34 prior to the radial assembly therebetween. With the control shaft 60 in the retracted position, the flange 72 is shown to be axially outboard of the hub shell 100 to provide clearance such that the flange 72 may be radially assembled to the relieved region 38 as shown in FIGS. 2d-e.

The shaft 65 may be considered as the engagement end of the control shaft 60 and the flange 61 may be considered as the handle end of the control shaft 60. For explanation purposes and referring to FIGS. 2a-h, it is understood that an orientation described as "handle end" refers to an axial location proximal to the flange 61 and distal the end face 69. Conversely, an orientation described as "toward the engagement end" or "engagement end" refers to an axial location proximal to the end face 69 and distal the flange 61. The handle end may also be termed the "control end".

Figure 2D:
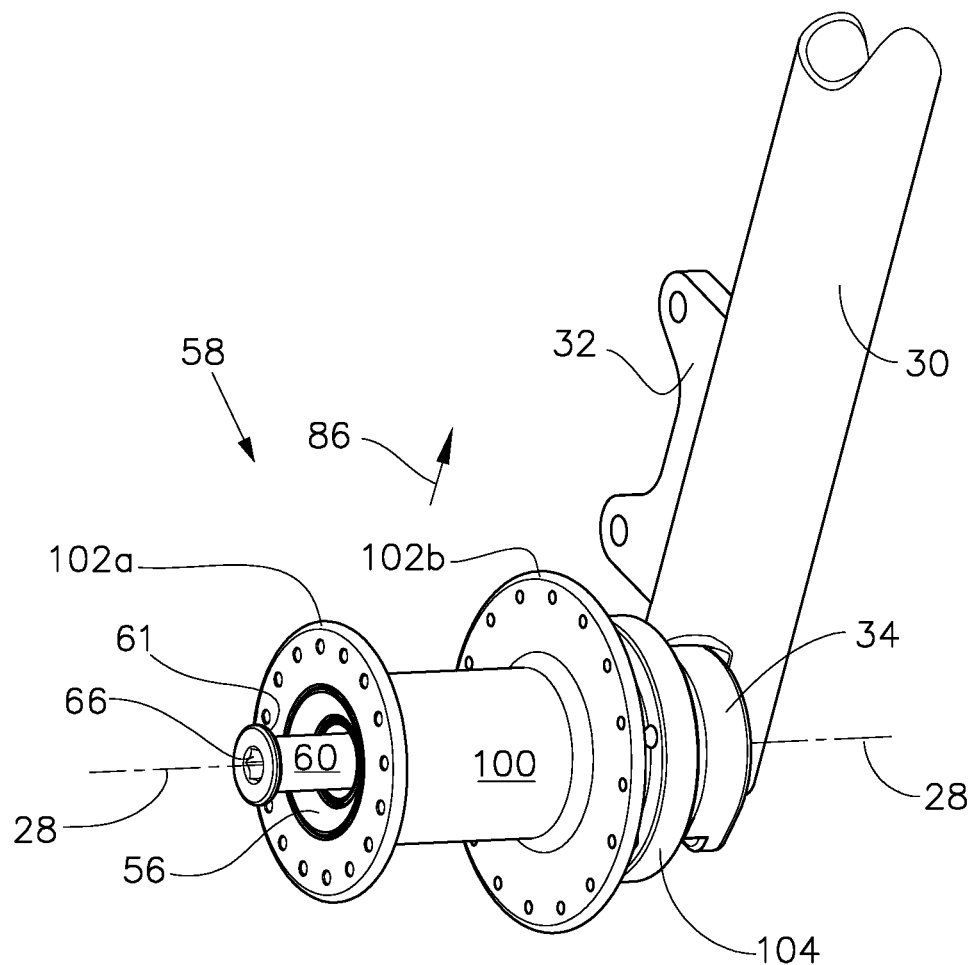
Figure 2E:
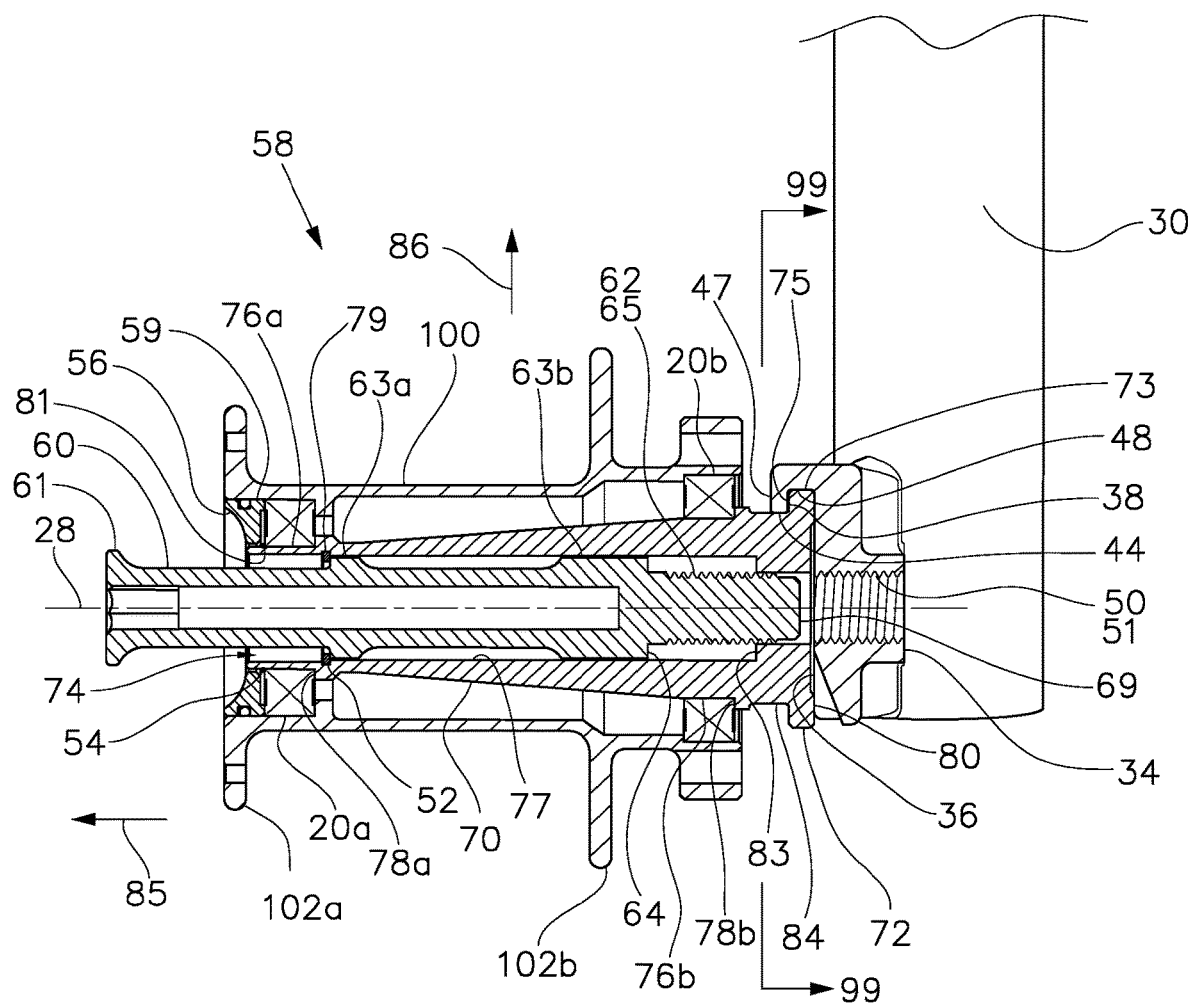
Figure 2F:
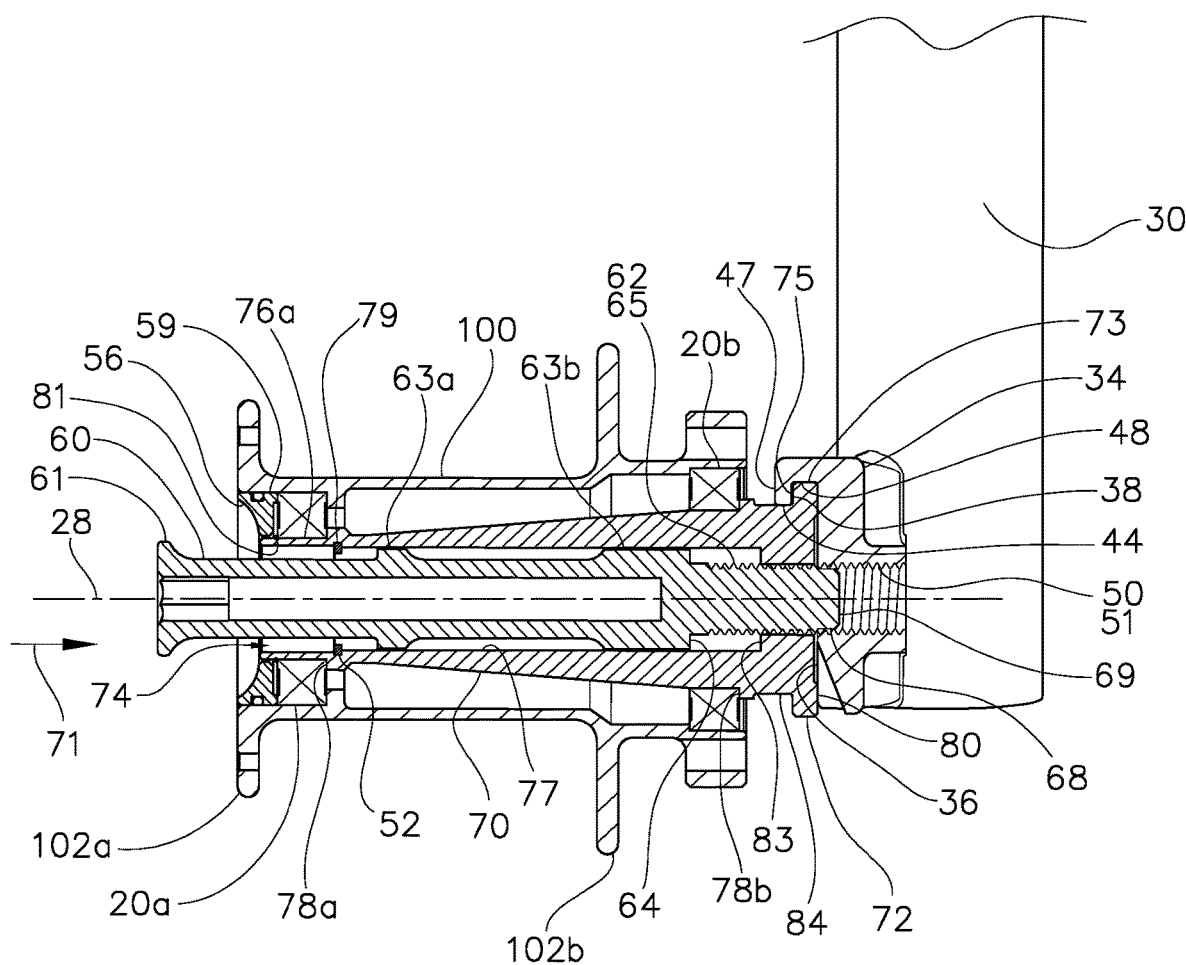
Figure 2G:
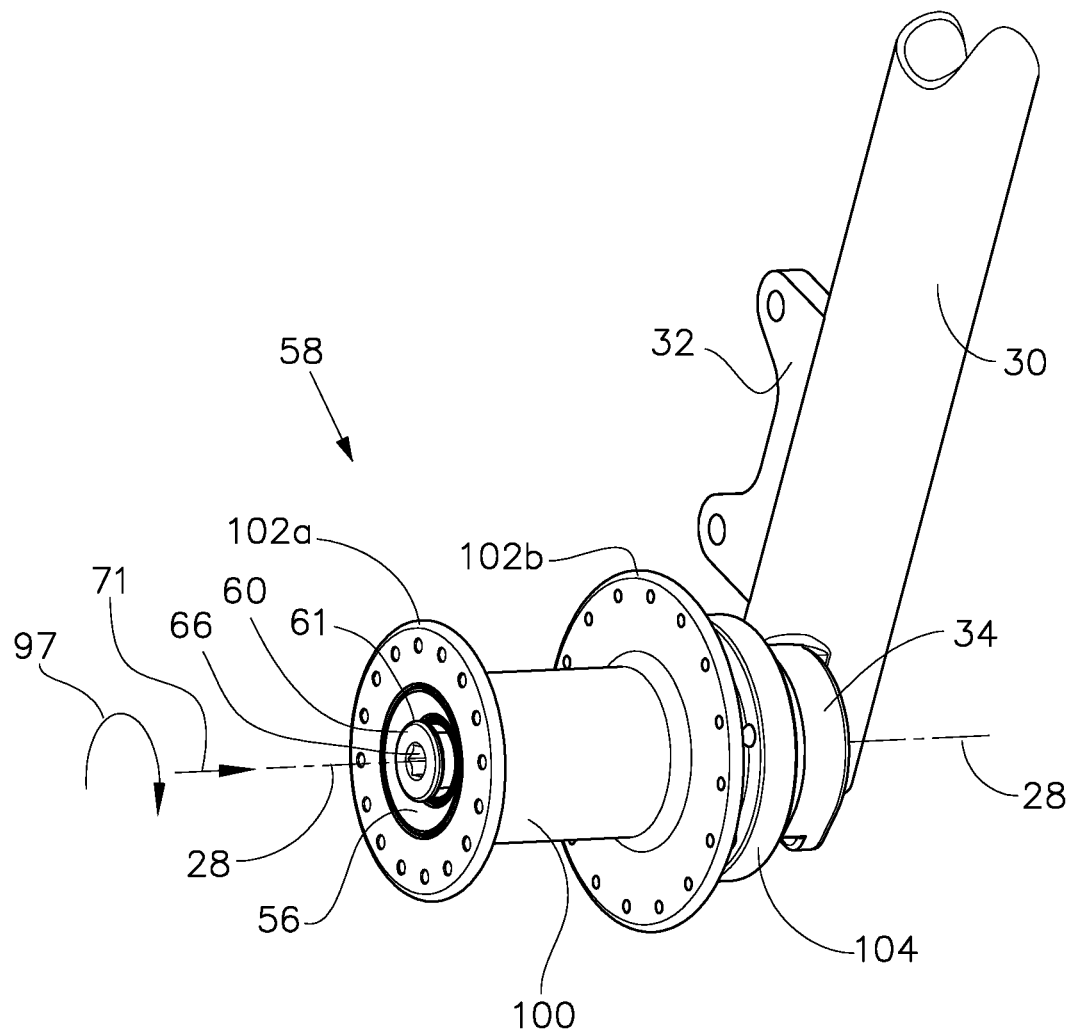
Figure 2H:
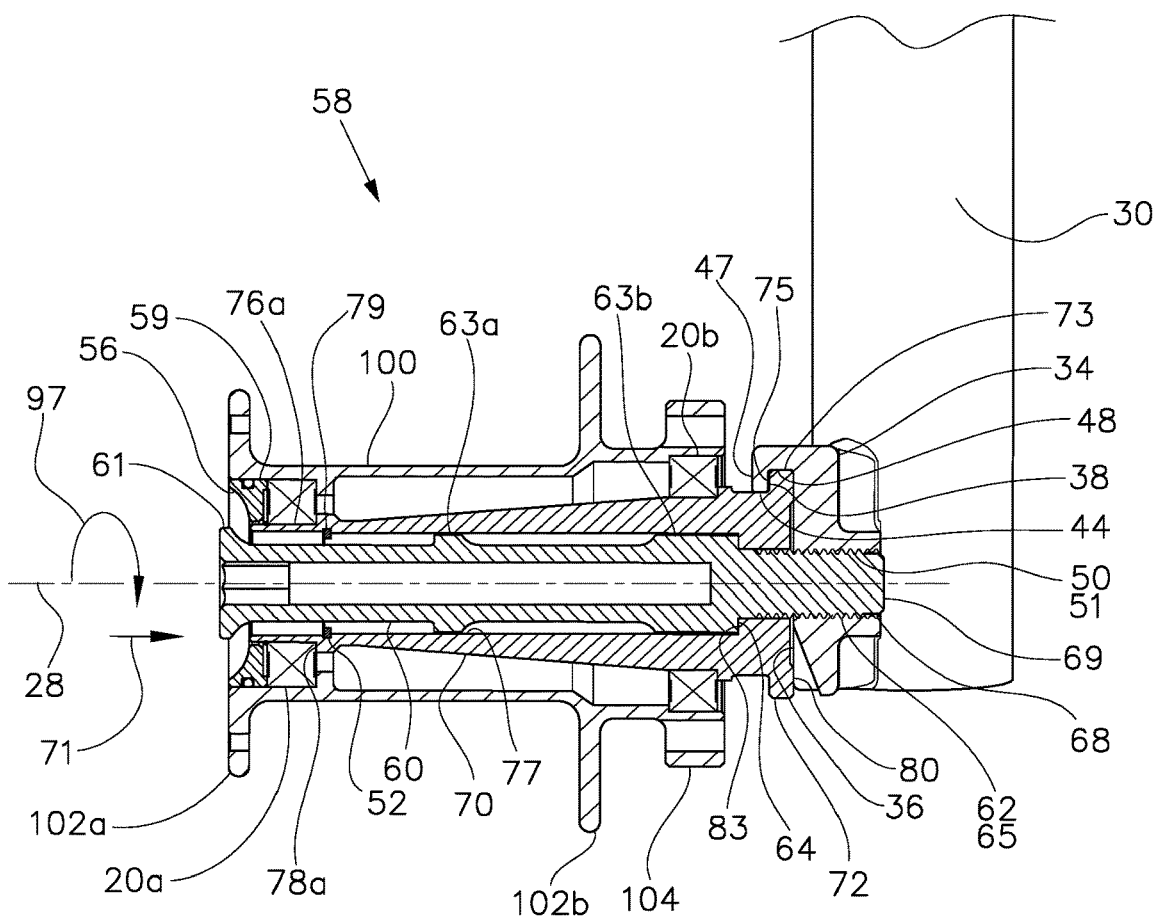
FIG. 2*h* is an axial cross-sectional view, taken along 87-87 of the embodiment of FIG. 2*a*, corresponding to the assembly sequence described in FIG. 2*g*.
Figure 2I:
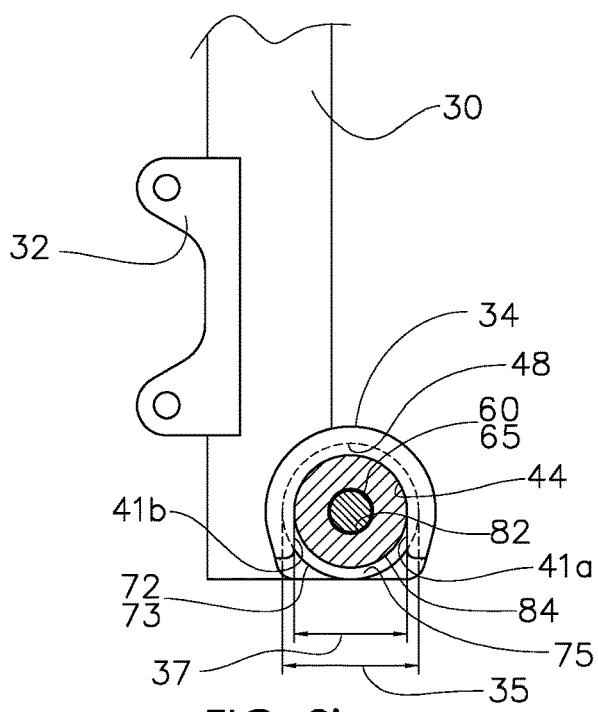
FIG. 2*i* is a cross-sectional view, taken along 99-99 of the embodiment of FIG. 2*e*, corresponding to the assembly sequence described in FIG. 2*e*.

Next, as shown in FIGS. 2d, 2e and 2i, the hub assembly 58 is moved in the generally radial direction 86 relative to the dropout 34, with the flange 72 passing through the entrance 42 and within relieved region 39 until the perimeter surface 73 radially abuts the closed end 48 and with the necked surface 84 passing within flange 46 until necked surface 84 is radially adjacent the closed end 44. The axle 70 is radially guided and piloted within open slot 49. The radial offset between the "U" shaped profiles of the flange 46 and the relieved portion 39 is generally equal to the radial offset between the perimeter surface 73 and the necked surface 84. Width 43 is sized to provide assembly clearance with the width 90 of flange 72. As such the flange 72 is now axially straddled by the open slot 40 with the inboard face 38 close to or axially abutting flange face 75 and with the outboard face 36 close to or axially abutting end face 80. Thus, the flange 72 of the axle 70 is axially captured and retained within the relieved region 39 of the dropout 34 to insure that the hub assembly 58 remains properly aligned and cannot axially shift or radially tilt (about an axis perpendicular to the axial axis 28) relative to the dropout 34. In other words, the flange face 75 and end face 80 are closely straddled by inboard face 38 and outboard face 36 respectively to provide axial guiding and piloting pre-alignment therebetween such that the axial axis 28 of the axle 70 remains generally parallel to the axial axis 28 of the dropout 34 during assembly of the axle 70 to the dropout 34 in direction 86. This straddled engagement also serves to axially pre-engage the axle 70 to the dropout 34 to limit and/or prevent axial separation therebetween during this assembly.

FIG. 2i clearly shows how the flange 72 radially overlaps the flange 46, with flange face 75 radially overlying inboard face 38. Also, closed necked surface 84 is radially abutting closed end 44 while perimeter surface 84 is radially abutting closed end 48 to limit the radial assembly travel of the axle 70 relative to the dropout 34. This is a radially abutting position of the axle relative to the dropout, which also corresponds to the radially concentric alignment of the external threads 62 with the internal threads 51 for subsequent threadable assembly therebetween.

This pre-alignment and pre-engagement provides an important convenience to the operator, since the hub assembly 58 is now self-aligned with the fork blade 30 and the operator does not need to manually align the two during subsequent assembly steps. This, combined with the radial abutment between perimeter surface 73 and the closed end 48, insures that the shaft 65 is properly aligned with the hole 50 for proper pre-engagement and threadable assembly therebetween in subsequent assembly steps. It also insures that the disc rotor (not shown) is properly centered and aligned with the brake caliper (not shown) during this assembly procedure. Thus this assembly procedure is now a simple one-handed operation and the operator does not need to maintain alignment of the wheel while the control shaft 60 is manipulated to threadably connect the hub assembly 58 to the dropout 34.

Next, as shown in FIG. 2f, the flange 61 is manually manipulated to axially shuttle the control shaft 60 in direction 71 (the "engagement direction") until the pilot tip 68 is now protruding axially outwardly from end face 80 to axially overlap within hole 50, thus radially retaining the hub assembly 58 with the dropout 34. This is considered as a pre-engaged position of the control shaft 60 such that the control shaft 60 and hub assembly 58 are now fully radially (and axially) engaged to the dropout 34. This pre-engaged position also serves to lock the alignment of the shaft 65 with the hole 50.

Next, as shown in FIGS. 2g and 2h, the operator may manually manipulate the control shaft 60, preferably by means of a hex key (not shown) engaged to the hex socket 66, to rotate the control shaft 60 in direction 97 to threadably assemble the internal threads 51 with the external threads 62 and to further advance the control shaft 60 in direction 71. This threadable assembly is tightened until shoulder 64 bears against shoulder 83 and end face 80 bears against outboard face 36 such that the axle 60 is axially sandwiched and clamped between shoulder 64 and outboard face 36. The control shaft 60 is now in a fully extended and engaged position to axially clamp the axle 70 to the dropout 34. The axle 60 is now structurally secured to the dropout 34 and the hub assembly 58 is firmly assembled to the fork blade 30.

The procedure for disassembly and removal of the hub assembly 58 from the dropout 34 is basically the reverse of the assembly and installation sequence just described. For removal, the control shaft 60 is unscrewed, in a direction opposite to direction 97, via handle hex key (not shown) until the external threads 62 are disengaged from the internal threads 51, displacing the control shaft 60 in direction 85 into the pre-assembled position shown in FIG. 2f. The flange 61 may then be easily manually gripped to retracted and withdraw the control shaft 60 further in direction 85 until the shoulder 67 abuts the snapring 52 and the end face 69 is flush or axially inboard from end face 80. The control shaft 60 is now in the retracted position such that the control shaft 60 is no longer axially overlapping the hole 50 and the corresponding radial engagement is released. The hub assembly 58 may now be radially removed from the dropout 34 in a direction opposed to direction 86 to complete the disassembly or uninstallation procedure and to remove the hub assembly 58 from the dropout 34.

While the hub assembly 58 is retained to dropout 34 with the control shaft 60 in the pre-engaged position (shown in FIG. 2f), this retained configuration normally serves as a convenience to maintain the radial alignment of the control shaft 60 with respect to the dropout 34. The pre-engaged position also serves as a safety retaining means to restrict separation of the hub assembly 58 from the dropout 34 in the event that the control shaft 60 inadvertently becomes unthreaded. While the hub assembly 58 is retained to the dropout 34 in the pre-engaged position and the clamped position is not required to assemble the hub assembly 58 to the dropout 34, the threadable assembly associated with the clamped position is preferred and serves to fortify and solidify this assembly.

In addition to being axially shuttled as described, the control shaft 60 has a generally smooth circular cylindrical surface such that, in the axial range between the extended and retracted positions, the control shaft 60 may be rotated relative to the axle 70 about the axial axis 28. Such rotation is especially beneficial when attempting to threadably engage external threads 62 with internal threads 51. Thus, the axially displaceable (in directions 85 and 71) control shaft 60 of the hub assembly 58 is operative to selectively engage the dropout 34. It is noted that the control shaft 60 is freely rotatable at all points in its axial travel. This may be a preferred feature, since the control shaft 60 must be rotatable to threadably assemble the external threads 62 with internal threads 51. However, in an alternative design, the control shaft 60 may be rotatably keyed to the axle 70 or another portion of the hub assembly 58 about axial axis 28 or else the control shaft 60 may employ a rotationally yieldable detent mechanism relative to the axle 70.

The axle 70 is shown to be axially fixed relative to the hub shell 100, while the control shaft 60 may be axially shuttled within the axle 70. Alternatively, the components of the axle 60 may be omitted and the control shaft may be axially shuttled directly within the bearings 20a and 20b.

It is understood that the pre-engaged position is provided as an additional convenience to the operator. If the pilot tip 68 and the corresponding pre-engagement were eliminated, the hub assembly 58 could still be assembled to the dropout 34 without this intermediate pre-engagement step between the retracted position and the extended and threadably engaged position.

It is envisioned that the hub assembly 58 may alternatively include a means to bias the control shaft 60 relative to the axle 70. For example, a compression spring may be incorporated into the hub assembly to axially brace between the shoulder 67 and the snapring 52. This spring would serve to bias the pilot tip 68 of the control shaft 60 in the extending and axially outward direction 71 toward its pre-engaged position to axially overlie and radially engage the hole 50. This axially outward bias would serve as a further safety to fortify and maintain this radial engagement. Thus, in the transition between FIGS. 2e and 2f, the operator would merely need to release the control shaft 60 and the spring would drive the pilot tip 68 into overlapping engagement with the hole 50, thus providing further convenience to the operator. As a further alternative, a spring (or other means to bias the control shaft 60) may be incorporated within the hub assembly 58 to axially bias the pilot tip 68 of the control shaft 60 in the retracting and axially inward direction 85 toward the retracted position.

While the embodiment of FIGS. 2a-i shows the control shaft 60 to be positively retained and axially inseparable from the axle 70, this is merely the preferred arrangement for convenience. This retention serves to provide a predetermined axial end-stop to control the axial travel of the control shaft in the retracting direction and also serves to prevent the control shaft 60 from being lost or separated from the remainder of the hub assembly 58. Alternatively, this retaining means (i.e. snapring 52) may be eliminated and the control shaft 60 may become completely withdrawn from axle 70 and the remainder of the hub assembly 58. As a further alternative, the axial retaining means may be a yieldable retaining means, such as a linear detent or the like.

Alternatively, it is envisioned that a yieldable linear engagement, such as a linear detent, may be incorporated into the hub assembly. For example, such a yieldable detent engagement may be utilized to maintain the axially retracted position of the control shaft 60 relative to the axle 70 such that this retracted position is maintained and the control shaft 160 will not simply flop back and forth (in directions 85 and 71) uncontrollably. When the operator desires to axially displace the control shaft 60 in the extending direction 71, such as the transition between FIG. 2e and FIG. 2f, the operator merely needs to manually press the flange 61 to urge the control shaft in direction 71 and overcome the linear detent engagement, allowing the control shaft 60 to be displaced in the engaging direction 71 toward the pre-engaged position. As a further alternative, such a yieldable linear engagement means may be utilized to control the axial position of the control shaft 60 relative to the axle 70 within a wide range of alternate axial positions. Such a yieldable linear engagement may be utilize to maintain a specific axial position of the control shaft or it may be utilized to maintain a specific axial position range of the control shaft. Further, multiple yieldable linear engagements may be utilized to maintain a corresponding multiple axial positions of the control shaft.

Figure 2J:
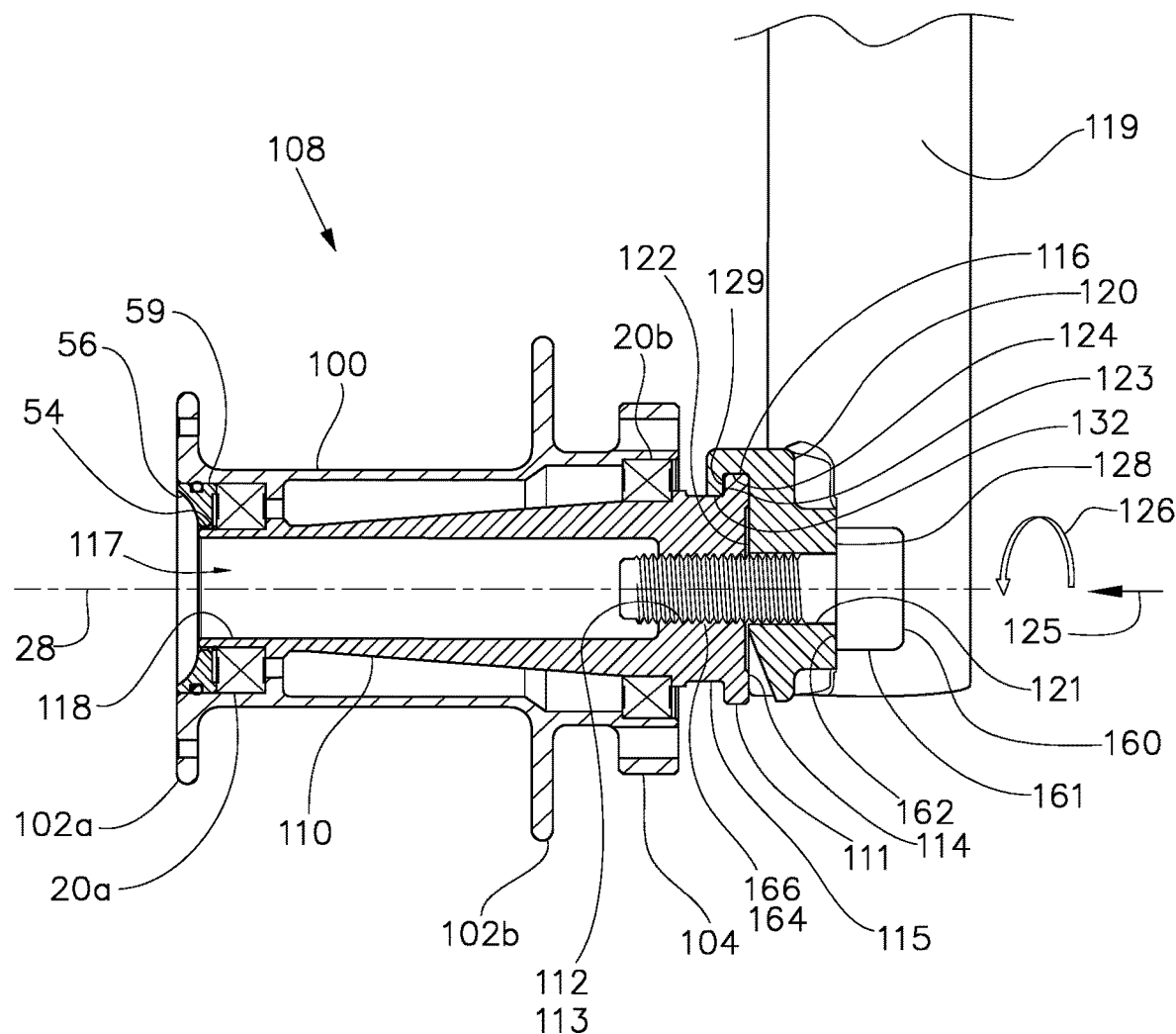
FIG. 2*j* is an axial cross-sectional view, taken along 87-87 of a second embodiment of the present invention, corresponding to the assembly sequence described in FIG. 2*h*.

FIG. 2j describes an alternate arrangement to that described in FIGS. 2a-i. Axle 110 is identical to axle 70 in most respects with the main exception that the stepped region 82 is replaced with a hole 112 having internal threads 113. Dropout 120 is identical to dropout 34 with the exception that hole 50 and internal threads 51 are replaced with a hole 121. Fork blade 119 includes dropout 120 that includes open slot (shown, but not labeled) that is identical in configuration to open slot 40 of dropout 34 of FIGS. 2a-i and is radially stepped to provide axial engagement of the axle 110 upon pre-assembly thereto. Like dropout 34, the open slot of dropout 120 includes an outboard face 122 and an inboard face 123 and include a relieved region 124, with associated geometry corresponding to dropout 34 and detailed in FIG. 2c.

Outboard face 122 and an inboard face 123 are axially opposed and facing each other. The relieved region 124 therebetween has an axial width (as detailed in FIG. 2c) to receive flange 111. The flange of open slot has a generally inverted "U" shaped profile with an entrance and with a terminus or closed end and sidewalls extending therebetween (as detailed in FIG. 2c). Slot axis extends generally radially between the entrance and closed end 44 and defines the axis along which the axle 110 may be assembled thereto (as detailed in FIG. 2c). The relieved region of open slot also has a generally inverted "U" shaped profile with an entrance (in common with the flange) and with a closed end (as detailed in FIG. 2c). The "U" shaped profile of the relieved region 124 is sized to receive the flange 111 and is radially outwardly offset from the "U" shaped profile of the flange which is sized to receive the necked surface 115. The "U" shaped profile of the flange 132 is sized to be radially reduced relative to flange 111 such that the flange 111 would not fit therein. Outboard face 122 includes a hole 121 extending axially outwardly to communicate with outer face 128.

There is no control shaft in this assembly, instead a screw 160 is utilized, including a head 161, a shank 164 with external threads 166 to threadably mate with internal threads 113, and a shoulder or clamp face 162. Head 161 also includes a hex socket (obscured) to accept a hex key (not shown) as a representative means to manually manipulate and rotate the screw 160 as is conventional. The hub shell 100, bearings 20a and 20b, snapring 54, and shield 56 are identical to those described in FIGS. 2a-i. FIG. 2j shows the components of the hub assembly 108 assembled in a manner similar to that described in FIG. 2h and with the hub assembly 108 assembled to the dropout 120 in an assembly sequence corresponding to FIG. 2h.

The axle 110 extends axially along an axial axis 28 to include two axially spaced bearing seats, each with corresponding shoulders respectively for assembly with bearings 20a and 20b respectively as further described in FIGS. 2a-i. Axle 110 also includes a flange 111 with an end face 114, a perimeter surface 116, a necked surface 115, and an axially inwardly facing flange face 129 that is axially opposed and facing away from the end face 114. The diameter of perimeter surface 116 is larger than the diameter of the necked surface 115 with a radial offset therebetween as further described in FIGS. 2a-i. It is preferable that the perimeter surface 116 and the necked surface 115 are generally concentric about axial axis 28. Axle 111 also includes an opening 117 extending axially therethrough with an enlarged region 118 for weight reduction and a hole 121 therethrough.

FIG. 2j shows the external threads 166 of the screw 160 as threadably mated to internal threads 113 to connect the hub assembly 108 to the dropout 120 and to clamp the dropout 120 between end face 114 and clamp face 162. This is in contrast to the embodiment of FIGS. 2a-i, where the threadable engagement of external threads 62 of the control shaft 60 is utilized to connect the hub assembly 58 to the dropout 34 and to clamp the axle 70 between outboard face 36 and shoulder 64.

As shown in FIG. 2j, the operator has pre-assembled the hub assembly 108 to the dropout in a manner similar to that described in FIGS. 2d-e, with flange 111 axially straddled between the inboard face 123 and outboard face 122 of the dropout. Next the operator has passed the screw 160 through the hole 121 in direction 125 and manually manipulated the screw 160, preferably by means of a hex key (not shown) engaged to the hex socket (obscured), to rotate the screw 160 in direction 126 to threadably assemble the internal threads 113 with the external threads 166. This threadable assembly is tightened until end face 114 bears against outboard face 122 and clamp face 162 bears against outer face 128 such that the dropout 120 is axially sandwiched and clamped between end face 114 and clamp face 162. The screw 160 is shown to be threadably tightened and cinched in directions 126 and 125. The axle 110 is now structurally secured to the dropout 120 and the hub assembly 108 is firmly assembled to the fork blade 119.

FIGS. 3a-g describe an embodiment of the present invention with a threaded engagement between a screw 160 and axle 170. The screw 160 may be considered as a second portion of an axle assembly 156 that also includes the axle 170. This threaded engagement may be threadably adjusted to increase and decrease the gap 187, thereby selectively connecting and disconnecting the axle assembly 156 with the dropout 134.

Figure 3A:
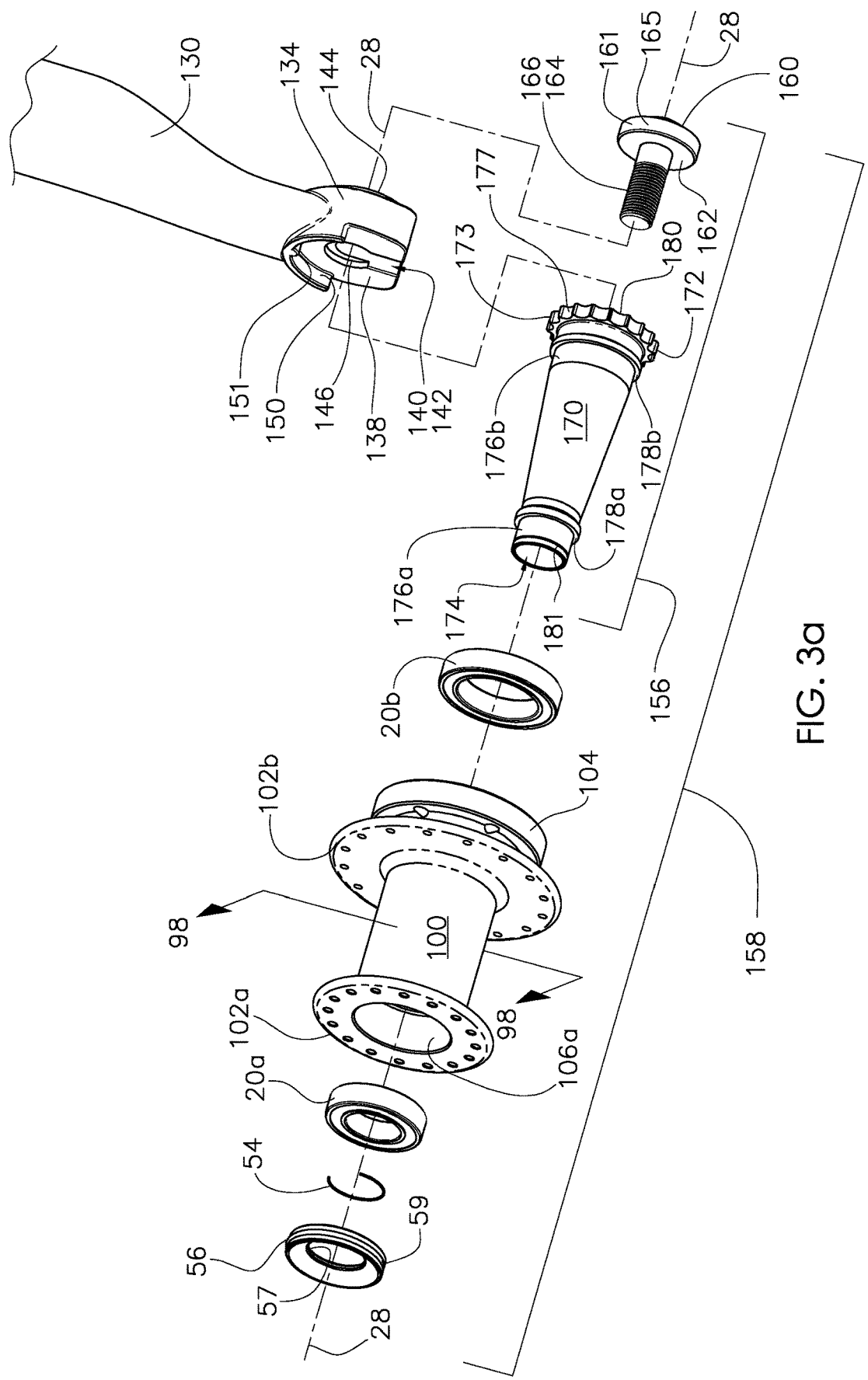
FIG. 3*a* is an exploded perspective view of a third embodiment of the present invention, showing a single-sided fork with dropout and a hub assembly.

In this embodiment, the dropout 134 includes an open-slot 140, for quick and easy assembly and removal of the hub assembly 158 therefrom. FIG. 3a is an exploded view, showing the individual components of this embodiment. Referring to FIGS. 3a-c, the dropout 134 may be considered mounting portion of the bicycle frame (not shown) or fork blade 130 to which the hub assembly 158 is mounted or connected. Fork blade 130 represents a portion of the frame or fork. Dropout 134 includes: an outboard face 136 with a collar 144 extending axially outwardly therefrom to outboard face 145 and to create axially projecting retaining surfaces 153a and 153b; inboard face 138 with counterbore 146 therein to create axially projecting retaining surfaces 147a and 147b; an alignment surface 150 projecting axially inwardly from the inboard face 138 with a key 151 projecting radially inwardly therefrom; and an open slot 140 having a generally inverted "U" shaped profile with an open entrance 142 and a terminus or closed end 148. Slot axis 141 extends generally radially between the entrance 142 and closed end 148 and defines the axis along which the axle 170 may be assembled thereto. Slot 140 effectively bifurcates the dropout 134 to create retaining surfaces 147a and 147b and retaining surfaces 153a and 153b. The dropout 134 has an overall axial width 152 between the inboard face 138 and the outboard face 145 of the collar 144.

Hub assembly 158 includes the axle assembly 156, bearings 20a and 20b, snapring 54 and shield 56. The hub shell 100, bearings 20a and 20b, snapring 54, and shield 56 are identical to those described in FIGS. 2a-i. Axle assembly 156 includes the axle 170 and the screw 160, which may also be considered as a discreet second portion of the axle 170. Hub shell 100 rotates around axle assembly 156 via bearing assemblies 20a and 20b.

The axle 170 extends axially along an axial axis 28 to include two axially spaced bearing seats 176a and 176b, each with corresponding shoulders 178a and 178b respectively. Bearing seat 176a includes an external snapring groove 181 adjacent thereto to receive snapring 54. Axle 170 also includes: a central opening 174 for weight savings; an end face 180; a radially outwardly extending flange 172 with and a generally circular perimeter surface 173 having a plurality of notches 177 extending radially inwardly therefrom; a stub 179 projecting axially outwardly from the end face 180 and having a diameter 175 and a face 171; and an internally threaded hole 182 extending axially inwardly from the face 171 with internal threads 183. It may be preferable that the notches 177 be evenly circumferentially distributed around the flange 172 such that they create cog-like peaks at the perimeter surface as shown here.

Screw 160 is of schematically convention configuration and includes a head 161 with a perimeter surface 165, a shank 164 with external threads 166 to threadably mate with internal threads 183, and a shoulder or clamp face 162. Head 161 also includes a hex socket 168 as a representative means to manually manipulate and rotate the screw 160 as is conventional.

Figure 3D:
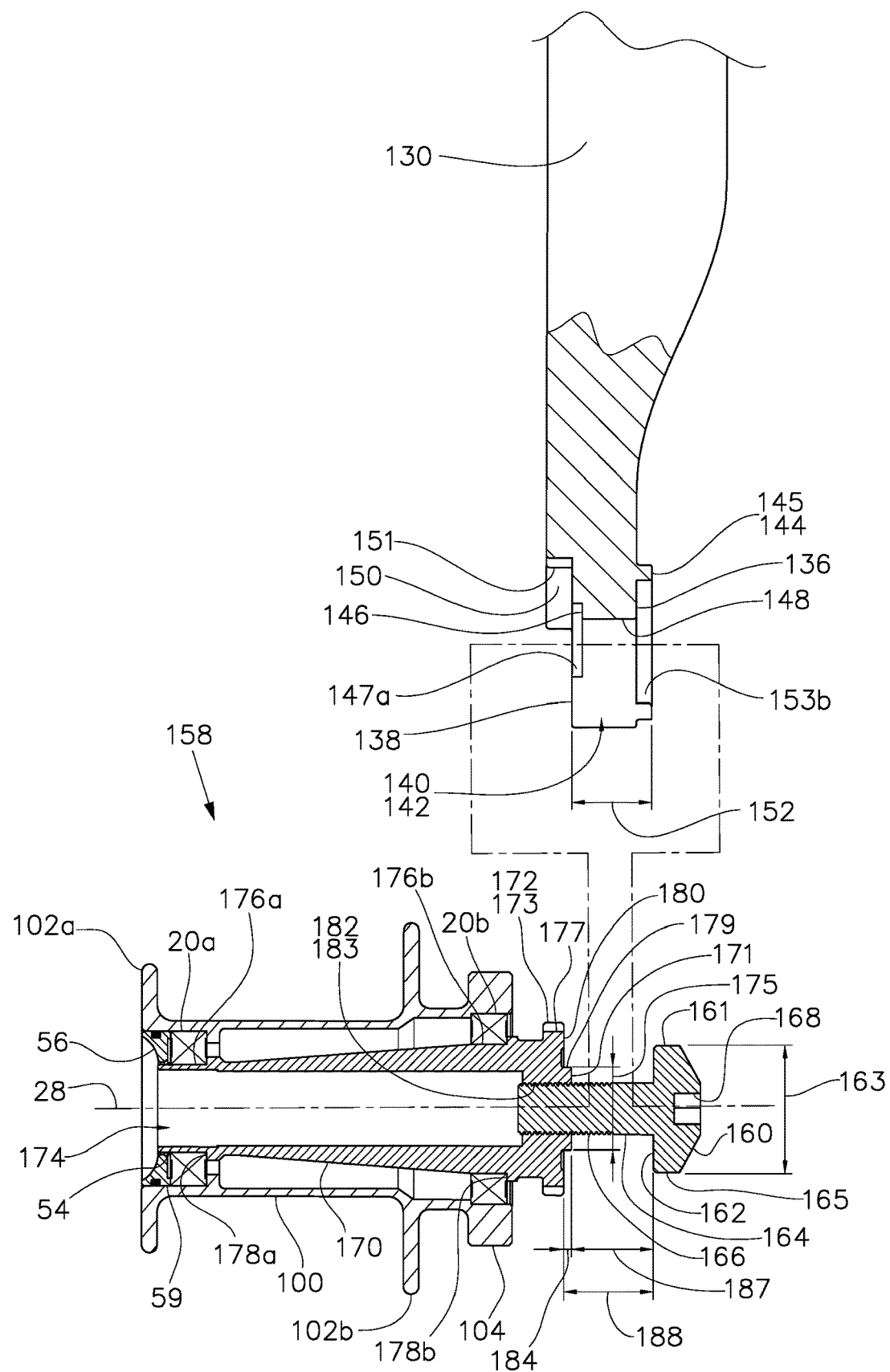
FIGS. 3*d*-*g* show the progressive sequential assembly steps involved in assembling the hub assembly to the dropout of the embodiment of FIG. 3*a*.

FIG. 3d shows the screw 160 as loosely threadably pre-assembled to the axle 170 with internal threads 183 mated with external threads 166. Internal threads 183 are threadably adjusted with external threads 166 to achieve an axial gap 187 between face 171 and clamp face 162 that is sized to be somewhat larger than width 152 to provide clearance for subsequent pre-assembly between the hub assembly 158 and the dropout 134. Hub assembly 158 is also shown to have an overall gap 188 between end face 180 and clamp face 162 and a projection distance 184 between end face 180 and face 171. Bearing 20a is assembled between bearing seat 176a and bore 106a and bearing 20b is assembled between bearing seat 176b and bore 106b in the conventional manner. Snapring 54 is assembled to groove 181 to axially retain the inner race of the bearing 20a to the axle 170. Shield 56 is assembled to hub shell 100 such that perimeter surface is press fit within bore 106a. The gap 187 is shown to be axially aligned with width 152 and with the axle 170 radially offset from the dropout 134 prior to the radial assembly between the hub assembly 158 and dropout 134.

Figure 3E:
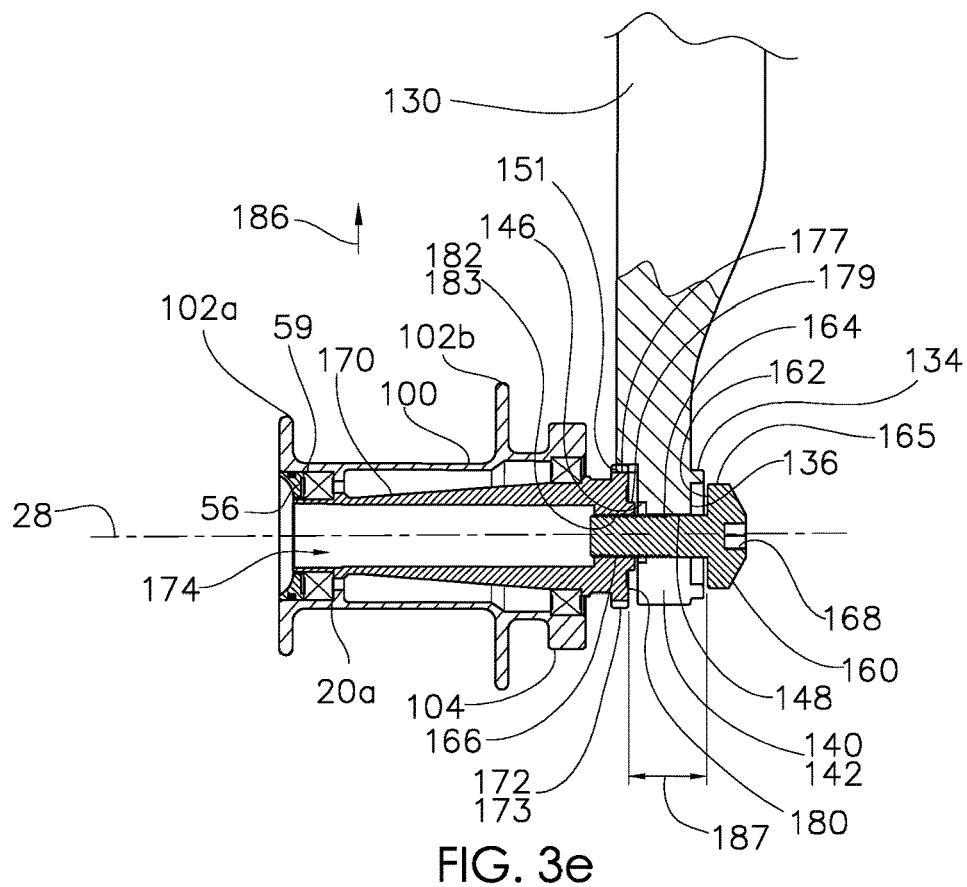

Next, as shown in FIG. 3e, the hub assembly 158 is moved in the generally radial direction 186 relative to the dropout 134, with the shank 164 passing through the entrance 142 of slot 140 until the perimeter surface 173 radially abuts the alignment surface 150. As the perimeter surface 173 radially approaches the alignment surface 150, one of the notches 177 also contacts and circumferentially self-aligns and radially nests in a mating circumferentially keyed engagement with the key 151. The dropout 134 is axially straddled between end face 180 (with face 171) and clamp face 162 during this pre-assembly step. Upon pre-assembly, the hub assembly 158 is radially aligned and loosely axially assembled to the dropout 134 as shown in FIG. 3e. The key 151 serves to circumferentially key and engage the mating notch 177 as an anti-rotation feature to limit rotation of the axle 170 relative to the dropout 134 about axial axis 28. It is preferred that overall gap 188 between clamp face 162 and face 171 is closely controlled relative to the width 152 such that the axle 170 is axially guided and piloted by the dropout 134 as it is displaced in direction 186 so that generally parallel alignment is maintained between the axle 170 an and the dropout 134. Further, the shank 164 is radially piloted and guided by the open slot 142.

Figure 3F:
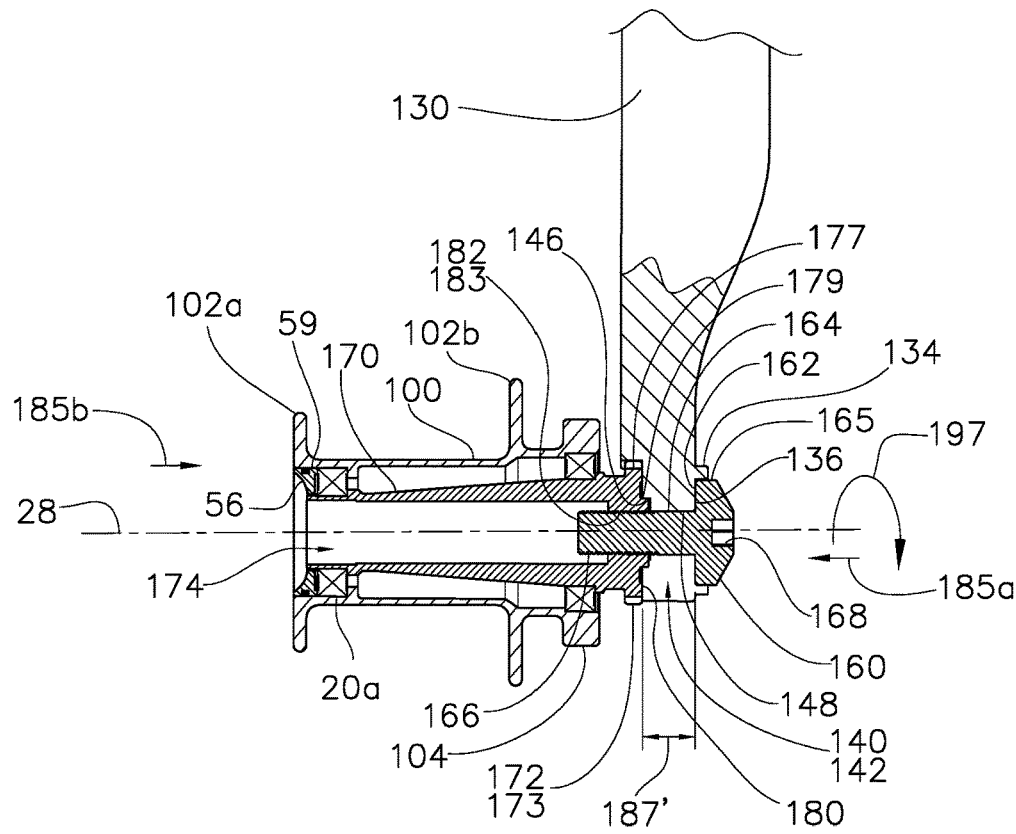
Figure 3G:
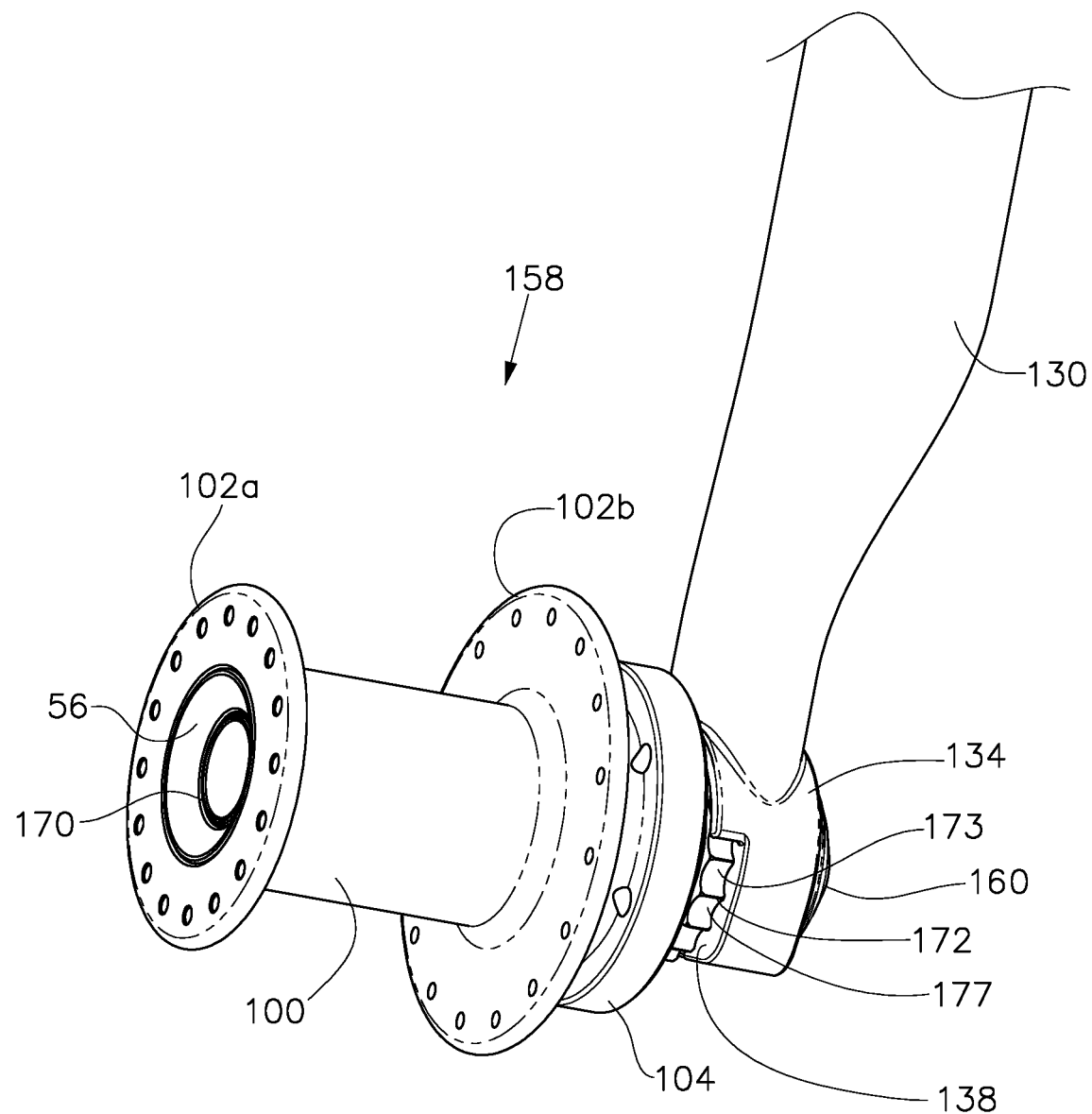

Next, as shown in FIGS. 3f and 3g, the screw 160 is threadably tightened in direction 197, by means of a hex key tool (not shown) engaged with the hex socket 168, relative to the axle 170. This serves to displace the screw 160 in direction 185a and to reduce the overall gap 188 such that the perimeter surface 165 axially overlaps the collar 144. Simultaneously, the hub assembly 158 may be shifted in direction 185b such that the stub 179 axially overlaps the counterbore 146. With the perimeter surface 165 axially overlapping the collar 144 and/or the stub 179 axially overlapping the counterbore 146, the engagement surfaces 147a and 147b and engagement surfaces 153a and 153b serve to axially overlie and radially retain the axle assembly 156 to the dropout 134 and prevent the hub assembly 158 from inadvertently becoming misaligned during this threadable tightening process, even before the screw 160 is fully threadably tightened. As the screw 160 is then further threadably tightened to a achieve a reduced gap 187' with the clamp face 162 contacting the outboard face 136 and the end face 180 contacting the inboard face 138. As the screw 160 is further threadably tightened and cinched, the dropout 134 becomes axially sandwiched and clamped between the end face 180 and the clamp face 162 to firmly assemble, connect, and secure the hub assembly 158 to the dropout 134 and fork blade 130. The wheel (not shown) associated with the hub assembly 158 is now fully mounted to the fork blade and is ready for use.

The anti-rotation feature between the key 151 and the mating notch 177 serves as an optional convenience to prevent the axle 170 from inadvertently spinning during this threadable tightening and cinching procedure and insures that the screw 160 may be threadably tightened in a controlled and predictable manner. It is noted that, for ease of assembly between the axle assembly 156 and the dropout 134, it is preferred that this circumferentially keyed engagement is self-aligning such that that this keyed engagement is easily achieved as the axle assembly 156 is assembled to the dropout 134 and without requiring an additional step to manually align this keyed engagement.

It is noted that the keyed engagement between the key 151 and notch 177 is a radially overlying engagement. As an alternative, an axially overlying keyed engagement may be substituted to provide this anti-rotation feature. For example, the end face 180 may alternatively include a first face knurl (not shown) and the inboard face 136 may alternatively include a second face knurl (not shown). In such an arrangement, when the axle assembly is displaced in direction 185b as shown in FIG. 3f, the first face knurl axially overlies and meshes with the second face knurl to achieve an anti-rotation feature therebetween.

It should be noted that, even in the event that the screw 160 becomes inadvertently threadably loosened relative to the axle 170 (for example: due to improper tightening or to vibration during use), the axle assembly 156 remains radially retained to the dropout 134 by means of the overlie engagement between the perimeter surface 165 and the engagement surfaces 153a and 153b and/or between the stub 179 and the engagement surfaces 147a and 147b. These retained engagements are an important backup safety feature to help prevent the hub assembly 158 and wheel (not shown) from inadvertently becoming separated from the fork blade 130. These retained engagements may be interpreted as providing a similar retaining function as the pre-engaged position described in FIGS. 2a-i where the pilot tip 68 is axially overlapping the hole 50 to provide a retained engagement between the hub assembly 58 and the dropout 34.

The procedure for uninstallation and removal of the hub assembly 158 from the dropout 134 is basically the reverse of the assembly and installation sequence just described. For removal, the screw 160 is unthreaded from the axle 170, in a direction opposite to direction 197, via handle hex key (not shown) until the gap 187 exceeds the width 152 as shown in FIGS. 3d and 3e. The hub assembly 158 can then be radially withdrawn from the dropout 134 along the slot axis 141 as shown in FIG. 3d, thus completing the disassembly and wheel removal procedure.

It is understood that the aforementioned retained engagements are provided as a convenience and a safety feature. These two retained engagements are also redundant to some degree and one or the other of these retained engagements may alternatively be eliminated to still provide a retained engagement. Furthermore, these retained engagements are merely representative of a wide range of possible alternative retained engagement geometries that may be utilized instead of, or in addition to, the aforementioned retained engagements. As a further alternative, these retained engagements may be eliminated entirely.

It is further understood that the anti-rotation feature between the key 151 and the mating notch 177 is merely a representative means to limit rotation between the axle 170 and the dropout 134 and is provided for safety and convenience. A wide range of potential alternative anti-rotation geometries may be utilized instead of, or in addition to, the aforementioned anti-rotation engagement. As a further alternative, such an anti-rotation feature may be eliminated entirely.

While my above description contains many specificities, these should not be construed as limitations on the scope of the invention, but rather as exemplifications of embodiments thereof. For example:

The dropouts 34, 120, and 134 of the embodiments shown here are shown to be connected to their respective fork blade 30, 119, or 130, which may imply that the corresponding axles 70, 110, or 170 are front axles. It is understood that this is merely a representative application and the dropouts 34, 120, and 134 may also be easily incorporated in the bicycle frame to receive a rear axle. As a further alternative, this cantilever axle assembly may be utilized in a wide range of vehicle wheel axle applications.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel axle assembly, comprising:
   an axle extending along an axial axis, including a first end thereof and a second end axially opposed to said first end;
   a hub shell that is rotatable about said axle and about said axial axis;
   a frame element, including a dropout for connection with said axle;
      wherein said axle is a cantilevered axle;
      wherein said first end is removably connected to said dropout;
      wherein said first end includes an axially outwardly facing first end face;
      wherein said dropout includes an axially inward facing inboard face and an open slot to receive said axle adjacent said first end, said open slot includes an open entrance portion, a closed terminus region, slot sidewalls extending between said entrance portion and said terminus region, and a slot axis; and
      wherein said axle is generally radially inwardly assembled to said open slot through said open entrance.

2. The vehicle wheel axle assembly according to claim 1, wherein said axle radially abuts said terminus region to limit radial displacement of said axle relative to said dropout at a radially abutting position.

3. The vehicle wheel axle assembly according to claim 1, wherein said dropout includes a closed portion thereof axially offset from said open slot, wherein said closed portion circumferentially surrounds an opening therein, and wherein said opening radially overlaps said open slot.

4. The vehicle wheel axle assembly according to claim 1, wherein said dropout includes a retaining surface, wherein, upon said assembly of said axle to said dropout, said axle axially overlaps said retaining surface to limit radially outwardly displacement of said axle relative to said dropout.

5. The vehicle wheel axle assembly according to claim 1, wherein said axle includes an axially extending axle opening therein, and including a control shaft extending within said axle opening that may be rotatably manipulated relative to said axle, said control shaft includes an engagement end adjacent said first end, and a control end axially opposed to said engagement end; wherein said control shaft is axially displaceable relative to said axle between:
   (i) a retracted position, wherein said engagement end is in an axially inward orientation relative to said axle and said control shaft is radially disengaged from said dropout such that said axle may be radially displaced relative to said dropout;
   (ii) an engaged position, wherein said engagement end is axially outward relative to said retracted position, and wherein said engagement end is axially overlapping said dropout in an overlie engagement to radially retain said axle to said dropout.

6. The vehicle wheel axle assembly according to claim 5, wherein said control shaft may be linearly shuttled between said retracted position and said engaged position in at least one of an engaging direction corresponding to the axially outwardly displacement of said engagement end, and a retracting direction corresponding to the axially inwardly displacement of said engagement end.

7. The vehicle wheel axle assembly according to claim 5, wherein said control shaft is retained to said axle.

8. A vehicle wheel axle assembly, comprising:
   an axle extending along an axial axis, including a first end thereof and a second end axially opposed to said first end;
   a hub shell that is rotatable about said axle and about said axial axis;
   a frame element, including a dropout for connection with said axle;
      wherein said axle is a cantilevered axle;
      wherein said first end is removably connected to said dropout;
      wherein said first end includes an axially outwardly facing first end face;
      wherein said dropout includes an axially inward facing inboard face and an open slot to receive said axle adjacent said first end, said open slot includes an open entrance portion, a closed terminus region, slot sidewalls extending between said entrance portion and said terminus region, and a generally radial slot axis; and
      wherein at least one of:
      (i) upon assembly of said axle to said dropout, said dropout is axially straddled between an axially outwardly facing first axle surface of a first portion of said axle and an axially inwardly facing second axle surface of a second portion of said axle; and
      (ii) upon assembly of said axle to said dropout, said axle is axially straddled between an axially outwardly facing first dropout surface of said dropout and an axially inwardly facing surface second dropout surface of said dropout.

9. The vehicle wheel axle assembly according to claim 8, wherein said axle includes said first axle surface and said second axle surface adjacent said first end and said dropout includes said first dropout surface and said second dropout surface, and wherein said second axle surface has a radially overlapping overlie engagement with said first dropout surface to limit axial displacement between said axle and said dropout.

10. The vehicle wheel axle assembly according to claim 8, wherein said first end face is said first axle surface and said inboard face is said second dropout surface.

11. The vehicle wheel axle assembly according to claim 8, wherein said axle is assembled to said slot in a generally radial direction such that said first dropout surface and said second dropout surface serve to guide said axle and maintain generally parallel axial alignment between said axle and said dropout during said assembly.

12. The vehicle wheel axle assembly according to claim 8, wherein said axle is connected to said dropout by means of a threadable engagement.

13. The vehicle wheel axle assembly according to claim 12, wherein said threadable engagement has a threadably released position wherein said threadable engagement is one of threadably loosened or threadably disengaged such that said axle may be assembled to and/or disassembled from said dropout and a threadably secured position wherein said threadable engagement is threadably tightened to connect said axle to said dropout.

14. The vehicle wheel axle assembly according to claim 12, wherein said axle radially abuts said dropout during assembly of said axle to said dropout to limit radial displacement of said axle relative to said dropout at a radially abutting position, wherein said threadable engagement is threadably disengaged during said assembly, and wherein said radially abutting position corresponds to radial alignment for said threadable engagement between said axle and said dropout.

15. The vehicle wheel axle assembly according to claim 12, wherein said threadable assembly is between an internal thread of said dropout that is rotationally fixed to said dropout and an external thread of said axle, wherein said external thread may be manually rotated relative to said axle to achieve said threadable assembly.

16. The vehicle wheel axle assembly according to claim 12, including a second portion of said axle, wherein said threadable engagement is between said axle and said second portion.

17. The vehicle wheel axle assembly according to claim 8, wherein said dropout is axially straddled between said first axle surface and said second axle surface, wherein said first axle surface is axially displaceable relative to said second axle surface to axially sandwich and clamp said axle to said dropout upon assembly therebetween.

18. The vehicle wheel axle assembly according to claim 8, wherein said first end includes a radially outwardly projecting flange portion to include said first axle surface and said second axle surface, wherein said dropout includes a radially outwardly projecting groove to include said first dropout face and said second dropout face, wherein said flange portion is axially straddled between said first dropout surface and said second dropout surface.

19. A vehicle wheel axle assembly, comprising:
an axle extending along an axial axis, including a first end thereof and a second end axially opposed to said first end;
a hub shell that is rotatable about said axle and about said axial axis;
a frame element, including a dropout for connection with said axle;
wherein said axle is a cantilevered axle;
wherein said first end is axially outboard of said hub shell and removably connected to said dropout; and
wherein said axle is assembled to said dropout in a generally radial direction such that said axle is circumferentially engaged to said dropout by means of a keyed engagement therebetween to limit the rotation of said axle relative to said dropout about said axial axis.

20. The vehicle wheel axle assembly according to claim 19, wherein said keyed engagement is a radially overlying keyed engagement between a radially projecting first keying surface of said axle and a radially projecting second keying surface of said dropout.

* * * * *